United States Patent [19]

Hatfield

[11] Patent Number: 4,708,812
[45] Date of Patent: Nov. 24, 1987

[54] ENCAPSULATION OF PHASE CHANGE MATERIALS

[75] Inventor: James C. Hatfield, St. Albans, W. Va.

[73] Assignee: Union Carbide Corporation, Danbury, Conn.

[21] Appl. No.: 749,098

[22] Filed: Jun. 26, 1985

[51] Int. Cl.$^4$ .......................... B01J 13/02; C09K 5/06
[52] U.S. Cl. ........................................ 252/70; 118/62; 427/213.31; 427/213.34; 428/402.24
[58] Field of Search .............. 427/213.34; 428/402.24; 252/70; 165/1

[56] References Cited

U.S. PATENT DOCUMENTS

| 3,272,897 | 9/1966 | Herman et al. | 264/109 |
| 3,577,515 | 5/1971 | Vandegaer | 252/182 X |
| 4,020,210 | 4/1977 | Geer | 428/402.24 X |
| 4,102,800 | 7/1978 | Popoff et al. | 428/402.24 X |
| 4,341,649 | 7/1982 | Burns et al. | 252/70 |
| 4,379,071 | 4/1983 | Schnöring et al. | 427/213.34 |
| 4,504,402 | 3/1985 | Chen et al. | 428/402.24 X |

Primary Examiner—Richard D. Lovering
Attorney, Agent, or Firm—Gerald L. Coon

[57] ABSTRACT

Solid phase change materials, such as CARBOWAX® polyethylene glycol 8000, are encapsulated in a condensation polymeric shell to provide heat storage material for use in such things as solar heating devices. The phase change material is put into particulate form and then is coated with a reactive monomer, such as ethylene diamine. Then the monomer coated particulates of phase change material are reacted with prepolymers, such as isocyanate-terminated polybutadiene diol, to form elastomeric, condensation polymeric shells. The polymers have elastomeric (flexible) segments which are the prepolymeric portions. The encapsulated phase change material has little or no significant loss of its latent heat of fusion due to its encapsulation.

27 Claims, 7 Drawing Figures

ENCAPSULATION OF PHASE CHANGE MATERIALS

BACKGROUND OF THE INVENTION

1. Field of the Invention

The invention relates to heat storage material such as those that are used in solid heating applications for heating interior spaces of buildings and the like. The invention more specifically relates to encapsulated phase change material for use as such heat storage material and to the processes of preparing and using such encapsulated phase change material.

2. Background

Low temperature thermal energy storage is essential for matching the supply of solar energy to the demands for space and water heating. Combined, these demands account for more than two-thirds of the total residential energy usage in the United States.

A widely-used method for the storage of heat in solar energy applications involves the use of water as a heat storage medium, wherein the water is heated by the sun and is later cooled to release the stored heat as it is needed. Water has been widely used for this purpose because it is readily available and has low corrosivity. However, in order to store practical amounts of heat, a large volume of water is necessary, requiring that large areas be dedicated to water storage.

Another method involves the use of rocks as a heat storage medium, generally in conjunction with a pumped fluid, such as air, to carry the heat to and from the storage area where the rocks are contained, the solar energy collectors and rooms to be heated. As with heat storage with water, heat storage with rocks requires a large volume of rocks to be practical.

In a process where the medium does not go through a phase-change during the heating and cooling cycle, such as those using water or rocks, the heat is stored as an increase in enthalpy of the storage medium as it is heated. Heat is released as the storage medium cools and the enthalpy of the medium is lowered.

This can be mathematically illustrated by equation (1):

$$Q = M \cdot \int_{T_1}^{T_2} C_{pm} dT \qquad (1)$$

wherein Q is the amount of heat released or absorbed as the medium is cooled or heated between temperatures $T_1$, and $T_2$, i.e., the amount of the heat stored in the medium during the heating-cooling cycle, M is the mass of the medium, $T_2$ is the highest temperature of the heating-cooking cycle, $T_1$ is the lowest temperature of the heating-cooling cycle, $C_{pm}$ the constant pressure heat capacity of the heat storage medium and dT the differential temperature. Generally in the temperature ranges involved in solar heat storage the heat capacity is approximately constant, therefore, the simpler equation employed is:

$$Q = M \, C_{pm}(T_2 - T_1) \qquad (2)$$

It can be seen from the above equations that there must be a change in temperature for heat to be absorbed or released and the amount of heat stored is proportional to the heat capacity. Thus, the amount of heat that can be stored is dependent on the temperature range of the heating and cooling cycle and also upon the magnitude of the heat capacity.

Because of the inherent magnitudes of the heat capacities of substances currently or previously used as single phase heat storage media and the temperature ranges employed in heat storage methods, generally the only way to store practical amounts of heat in a single-phase process is to have a large mass of the heat storage medium.

Since such a mass is undesirable in the typical case, it has been proposed to use a medium that changes phase during the heating and cooling cycle. Generally suggested are media that would melt upon being heated and solidify upon being cooled. In such a process the heat would be stored in the form of the heat of fusion of the medium. During the change in phase, heat would be released or absorbed without a change in temperature of the medium as it is freezing or melting. The heat storage process using such a phase-change medium can be represented mathematically as:

$$Q = M \cdot \int_{T_m}^{T_2} C_{pl} dT + M \cdot h_f + M \cdot \int_{T_1}^{T_m} C_{ps} dT \qquad (3)$$

wherein $C_{ps}$ and $C_{pl}$ are the heat capacities per unit mass for the solid and liquid respectively, $T_m$ is the temperature of the melting point of the medium, $h_f$ is the heat of fusion, and Q, M, dt, $T_1$, and $T_2$ are defined as above. Assuming, the heat capacities are approximately constant, then:

$$Q = M[(T_2 - T_m)C_{pl} + h_f + (T_m - T_1)C_{ps}] \qquad (4)$$

If the heat of fusion is high and the temperature range is narrow, then the heat capacity terms in Equation (4) are not significant and it can be further simplified to:

$$Q = M \, h_f \qquad (5)$$

From Equation (5) it can be seen that if the heat of fusion is high, the mass of the medium can be proportionately reduced. It can also be seen that the release or absorption of heat does not require a change in temperature of medium while it is freezing or melting. Thus, a substance may be useful as a phase-change heat storage medium if it melts and solidifies within the temperature range encountered in solar heat storage methods. This would be from about room temperature (20° to 25° C.) to temperatures obtainable from solar heat collection devices, i.e., about 50° C.

A suitable phase-change heat storage medium or phase change material (PCM) would also have a high heat of fusion in order to reduce the mass or the volume required to store the necessary amount of heat. Also, if the heat of fusion of the medium is high, the temperature range of the heating and cooling cycle need only be in a narrow range encompassing the melting temperature to provide for the storage of relatively large amounts of heat.

Certain paraffins have been suggested as phase-change media, as for example in Bruce Anderson and Michael Riondan, "*The Solar Home Book*", Brick House Publishing Co., Harrisville, Hampshire, at p. 191. The paraffins suggested are certain paraffins commercially available for use in solar heat applications. These paraffins are cheaper than eutectic salts and have a relatively high heat of fusion of around 36 calories per gram. However, they have their own unique problems. Such paraffins degrade plastics and corrode some metals such as copper. When exposed to air, hot paraffins slowly oxidize or degrade to form more corrosive oxidation products, such as organic acids. Another difficulty, as reported by Anderson et al., lies in the fact that paraffin expands by about 20 percent when it melts, thereby causing problems of containment. When it solidifies and releases stored heat, the paraffin shrinks and pulls away from the container wall, drastically slowing the rate of the transfer of heat out of the container.

Certain eutectic salts have also been proposed as heat storage media because of their high heats of fusion and their melting points within the appropriate range. These salts are particularly desirable because of their high heats of fusion, thus they are usable in small volume applications. Among the salts suggested are sodium sulfate decahydrate (melting point 32° C., heat of fusion 51 cal/g), calcium chloride hexahydrate (melting point 30° C., heat of fusion 40.7 cal/g), sodium carbonate decahydrate (melting point 32.5 to 34.5° C.), calcium nitrate tetrahydrate (melting point 39.7° to 2.7° C.) and sodium thiosulfate pentahydrate (melting point 40° to 45° C.).

However, eutectic salts are extremely corrosive when compared to water or organic phase-change media, such as the paraffins discussed above. Also, the proposed salts are hydrates It is well known that hydrated salts, when exposed to varying humidity and temperature conditions, will change their composition or degree of hydration. In eutectic salts, this results in a solid phase that does not melt at an appropriately low temperature. Thus, when used as phase-change heat storage media, eutectic salts cannot be stored in conventional storage tanks but must be packaged in special non-corrosive containers that are sealed to maintain the composition of the salts. R. H. Montgomery and J. K. Budnik, "*The Solar Decision Book*," Dow Corning Corporation, Midland, Mich., at page 14-5, referring to eutectic salts and paraffins, states the following:

"Phase-changing materials meet the requirements for small-volume heat storage. However, they are not commercially feasible at this time. The costs of properly packaging these materials in some type of container that would work for solar storage are currently prohibitive. There are performance problems as well. The materials work only within a narrow temperature range, and they require frequent replacement."

"These shortcomings of phase-changing materials plus the lack of other suitable storage concepts - leaves water and rocks as the best solar storage choices at this time. Water and rocks should continue as the most popular storage materials for at least the next five years."

U.S. Pat. No. 4,360,442 discloses a process for the storage of heat involving heat transfer to and from a heat storage medium wherein the heat storage medium changes phase as it absorbs or releases heat. Ethylene carbonate-containing hexamethylcyclotrisiloxane is used as the heat storage medium.

Phase change materials, such as salt hydrates, paraffin, napthalene, and crystalline polymers like high density polyethylene and CARBOWAX® polyethylene glycol 8000, (Union Carbide Corporation, Danbury, Conn., U.S.A.) accomplish low temperature thermal energy storage and offer potential size, weight and overall cost advantages when measured against sensible heat storage schemes. If they could be stabilized in small particle sizes, e.g., 5 to 10 mm in diameter or smaller, heat transfer to and from phase change materials (PCMs) is dramatically improved owing to the increased surface to volume ratio. This size range makes phase change materials amenable to use in active heat exchange systems, such as, packed bed exchangers, in which a heat transfer fluid circulates through the particle bed. It also makes them available for passive designs where the phase change material is incorporated into building materials, such as, floors, walls and ceilings.

There are at least two ways of reducing phase change materials to a useful particle size range and maintaining their particulate character through repeated freeze/thaw cycling. One is to render the particles "form stable" by chemically crosslinking the phase change material molecules, an approach practical only with organic, high molecular weight phase change materials. The object is to retard the flowability of the phase change material in its molten state without materially reducing its heat of fusion. The art has mildly crosslinked high density polyethylene and produced nonspherical particles roughly 6 mm across. See: Salyer et al., I.O., "*Form Stable, Crystalline Polymer Pellets For Thermal Energy Storage*," Proc. Intersoc. Energy Conversion Eng. Conf., 13(2), 948–962 (1978); and Whitaker, R. B., et al., "*Energy Storage For Solar Air Conditioning Applications Utilizing A Form-Stable, High Density Polyethylene Pellet Bed*," NTIS CONF 790328-1 (1978).

A second way to impart "form stability" is through encapsulation of the phase change material. See U.S. Pat. No. 4,219,072. Mebalick, E. M., and A. T. Tweedie, "*Two Component Thermal Storage Material Study: Phase II*," NTIS COO/2845-78/2 (May 1979) encapsulated paraffin in the 100 to 1000 micron particle size range. Employing an interfacial polymerization technique, they formed polyamide shells around wax cores. Their goal was to demonstrate the utility of the encapsulated phase change material in a fluidized bed heat exchanger using water as the heat transfer fluid. Plugging of the heat exchanger, due primarily to fine particles (less than 100 micron diameter), prevented their completing the original experimental program. Repeated freeze/thaw cycling of quiescent particles showed no signs of mechanical failure of the polyamide shells.

A published example in which the thermal properties of the encapsulated phase change materials were measured in subsequent freeze/thaw cycling was reported in Frost, C. E., and T. L. Vigo, "*Salts Raise Specific Heats Of Hollow Fibers*", C&E News, page 67, (Sept. 7, 1981). Researchers at the USDA Textiles and Clothing Laboratory introduced various salt hydrates into preformed hollow fibers made of polypropylene or rayon and then determined the heat capacity of the fibers in a differential scanning calorimeter (DSC). Glauber's salt, $Na_2SO_4.10H_2O$, with borax as the nucleation agent, apparently lost some of its heat of fusion following imbibition into polypropylene fibers. They stated that $CaCl_2.6H_2O/SrCl_2.6H_2O$ contained in polypropylene fibers, the same salt hydrate combination in rayon hollow fibers, and $Na_2SO_4.10H_2O$/borax in rayon fibers "exhibited desirable thermal characteristics through at least five heating and cooling cycles."

Pennwalt took another look at phase change material encapsulation in Clen, J., et al., "*Pelletilization And Roll Encapsulation Of Phase Change Materials*", Proc. 6th Annual Thermal And Chemical Contractors' Review Meeting, (Pub. 1982), pages 177 to 184. This time, researchers studied the pelletilization and then roll encapsulation of wax and several salt hydrates. Water-borne latexes were the principal coating material. The mechanical integrity of the polymer shells was maintained after the thermal cycling of wax, Glauber's Salt, and $Na_2S_2O_3.5H_2O$ particles in quiescent water/ethylene glycol fluids and $Na_2HPO_4.12H_2O$ particles in a calcium chloride solution. No testing of the heats of fusion was cited, either following encapsulation or thermal cycling.

Interfacial polymerization has been employed to form films over other solid substrates as well. Whitfield, Miller and Wasley published several articles and received several patents for a technique to impart shrink resistance to wool. Their patents report other fibrous materials to which the films can be applied. Whitfield, R. E., et al., "*Stabilization Of Wool Fabric By Interfacial Polymerization*", Textile Res. J., Vol. 31, p. 74, (1961), reported the coating of wool fibers by polyamides, in particular, poly(hexamethylene sebacimide). Their best results followed immersing the fiber first in an 8 percent aqueous solution of hexamethylene diamine for 15 seconds and then in a 2 percent solution of sebacoyl chloride in carbon tetrachloride for the same time. Whitfield, R. E., et al., "*Wool Fabric Stabilization By Interfacial Polymerization*", Textile Res. J., Vol. 31, pp. 704–712, (1961). Subsequent work demonstrated that a significant feature of their discovery was the chemical bonding of the polymer to the fiber. Although not all of the polymer was grafted, the grafted fraction alone was responsible for the enhanced shrink resistance—see Whitfield, R. E., et al., "*Interfacial Polycondensation, I. The Formation Of Surface Graft Polymers On Wool*," J. Appl. Poly. Sci., 8, 1607–1617 (1964). Whitfield, R. E, et al., "*Wool Fabric Stabilization By Interfacial Polymerization. Part III. Polyurethanes,*" Textile Res. J., 32, 743–750 (1962), involves work in the same area using polyurethanes. Whitfield, R. E., et al., "*Wool Stabilization By Interfacial Polymerization. Part IV. Polyureas, Polyesters, Polycarbonates, And Further Studies On Polyamides,*" Textile Res. J., 33, 440–444 (1963), involves further work in the same area using polyureas, polyesters and polycarbonates. Whitfield, R. E., et al., "*Wool Fabric Stabilization By Interfacial Polymerization. Part V. Copolymers,*" Textile Res. J. 33, 752–754 (1963), also involves work in the same area using copolymers. U.S. Pat. Nos. 3,078,138, 3,079,216, 3,079,217, 3,084,018, 3,084,019 and 3,093,441 resulted from such work.

U.S. Pat. No. 3,078,138 claims, for example, a process for treating a fibrous material which comprises serially depositing on the fibrous material in superposed phases in interfacial relationship a pair of complementary, direct-acting organic, polyamide-forming intermediates. At least one of the phases is liquid. The intermediates directly react under the conditions to form a polyamide in situ on the material. Patent '138 asserts that the polymers formed on the wool fibers are not merely physical coatings and that they are chemically bonded to the wool, that is, the added polymer is grafted onto the wool. The other patents in that series are similar in disclosure and claims.

U.S. Pat. No. 3,143,405 deals with encasing glass fibers, moving at speeds in excess of 4000 feet per minute, in polyamides. The fibers are first immersed in a 10 percent solution of hexamethylenediamine in water and then in a 10 percent solution of adipyl chloride in carbon tetrachloride. The polyamide coating, or "size," prevents mutual abrasion of the glass strands and also promotes lubrication to aid in spinning and weaving operations.

BROAD DESCRIPTION OF THE INVENTION

The invention involves encapsulated solid phase change materials for thermal energy storage, preferably CARBOWAX ® polyethylene glycol 8000 or calcium chloride, encapsulated in a shell of an elastomeric condensation polymer, such as a polyurethane-urea shell. The encapsulated solid phase change materials are quite suitable for thermal energy storage in a solar collection apparatus. There is no significant loss of the latent heat of fusion of the solid phase change material upon having been encapsulated with a condensation polymeric shell. During usage the encapsulated phase change material picks up sensible heat after phase change. The encapsulated phase change material particles of the invention have good integrity. It is important that the polymeric shell be elastomeric so that it can accommodate, without any splitting or the like problems, when the volume of the phase change material changes due to change of phase.

An important advantage of the encapsulated phase change materials of the invention is that they, contrary to the prior art materials, have been encapsulated without any significant loss in their latent heat of fusion.

The invention also involves a process for preparing encapsulated phase change material which is useful for thermal energy storage. The phase change material is encapsulated with a condensation polymeric film using interface polymerization technique. The invention does not use preformed polymers.

Polymerization requires that each small molecule have at least two reaction points or functional groups. The type of polymerization process used in the invention is condensation polymerization, in which the chain growth is accompanied by elimination of small molecules such as $H_2O$, or $CH_3OH$. In the invention, it is best to use a polymerization technique which provides for the removal or migration of the formed water, methanol or like from the in situ reaction site or zone.

In other words, condensation polymers are those in which the molecular formula of the repeat unit of the polymer chain lacks certain atoms present in the monomer from which it is formed (or to which it can be degraded). Condensation polymers are usually formed by the stepwise intermolecular condensation of reactive groups. The structural units of condensation polymers are usually joined by interunit functional groups.

The invention process uses bifunctional monomer systems and multifunctional monomer systems (some times themselves or some times with bifunctional monomers). Bifunctional monomers give linear polymers. Polyfunctional monomers, with more than two functional groups per molecule, give branched or cross-linked (three-dimensional) polymers. The properties of the linear and the three-dimensional polymers can differ widely. The polymeric shell must be elastomeric, which is achieved in the most preferred embodiment by using a prepolymer having flexible segments and a cross-linking monomer.

There are several types of condensation reactions which can be used in the invention. The direct reaction of a dibasic acid and a glycol to form a polyester, or a dibasic acid and a diamine to form a polyamide, can be used. Such reaction is often carried out with the use of heat, but below temperatures which melt or even slightly liquefy (or make tacky) the solid phase change material particles. The interchange reaction between a glycol and a diester to produce polyesters can also be used. An acid chloride or anhydride can be reacted with a glycol or a diamine to form a condensation polymer. The monomers must not be reactive with the solid phase change material.

As the volume of the phase change material is different for each phase it is in during its usage, the encapsulating shell is advantageously elastomeric. The polymeric shell is formed when the phase change material is in the solid state and can resiliently expand to accommodate the increased volume of the phase change material in its liquid state. The elastomeric shell shrinks snuggly around the phase change material when it returns to solid phase. Usually elastomeric polymers are those which have nonpolar, irregular chains and segments between cross-links. The elastomericity (or flexibility) of linear polymer chains and of the segments between cross-links in the polymeric shells are decreased by the presence of polar groups and regularity in the molecular structure. The best condensation polymeric shells are those which are rubbery (i.e., stretchable and resilient) and should be non-brittle and resistant to tear and impact. Usually if the glass-transition of the condensation polymer (e.g., random copolymerization) is below room temperature, the polymer is an elastomer. The condensation polymer should retain its elastomeric property after repeated freeze/thaw cycles of the encapsulated phase change material.

Even though the condensation polymerization of the invention can involve cross-linking, the degree of cross-linking must not be sufficient to destroy the elastomeric property of the polymeric shell.

At least the prepolymer or one of the monomers used to form the elastomeric shell should have a flexible segment.

Broadly speaking, interfacial condensation polymerization involves the reaction of two monomers to form a condensation polymer at the interface between two liquid phases, each phase containing one of the reactants (e.g., reactive monomers or reactive prepolymers). The polymer film or shell forms at the interface. High-molecular-weight condensation polymers can be formed in such manner. The method is very useful in the formation of polyamides, polyurethanes, polyureas, polysulfonamides, poly(urethane-urea) and polyphenyl esters.

The invention is quite useful in preparing condensation polymeric shells which are polyamides, polyurethanes, polyureas, polyesters, polycarbonates, polyacetals, polyanhydrides and interpolymers wherein the recurring units contain two or more different units of the classes of amide, urethane, urea, ester and carbonate.

This invention more specifically involves a process of preparing encapsulated phase change material particles. The particles of a solid phase change material are formed. The solid phase change material particles are contacted with a reactive monomer which is, preferably, a diol compound or diamine compound or mixture thereof, and which is in a liquid state. The monomer is not reactive with the solid phase change material particles. The monomer forms a coating thereof on the surface of the solid phase change material particles. The coated phase change material particles are contacted with a flexible monomer (or prepolymer) which is terminated with reactive groups, preferably isocyanate groups. The monomers (or monomer and prepolymer) are condensation polymerized to form a continuous, elastomeric, condensation polymeric shell around the particles.

Although all combinations of the flexible segments and isocyanates can be made into the prepolymers, which will react with amines, the rate of polymer formation together with interactions among the prepolymer, prepolymer solvent, and growing polymer rule out many as candidates that form tough, elastomeric and durable films around phase change material particles. Encapsulation of CARBOWAX ® polyethylene glycol 8000 or the salt hydrates, $Na_2SO_4.10H_2O$, $Na_2HPO_4.12H_2O$, $Na_2S_2O_3.5H_2O$, and $CaCl_2.6H_2O$, with polybutadiene diol as the elastomeric segment and toluene diisocyanate as the isocyanate gave the best results. The NCO/OH ratios preferably range from 1.5/1 to 3/1. The ratio of 2/1 resulted in the most durable shells.

Prepolymer concentration, the choice of solvent, the concentration of catalyst, and prepolymer solvent viscosity also impact the formation of a polymer shell. Using the polybutadiene/TDI prepolymer, a concentration in cyclohexane of 1.0 weight percent was too low to form a continuous shell. Coatings formed readily with concentrations of 2.5 to 10.0 weight percent with those of 4.0 weight percent judged the best. At concentrations lower than 4.0 weight percent the leakage rate rose during subsequent freeze-thaw cycling; at higher concentrations, particles showed a tendency to agglomerate in an "ebulating reactor".

Once the phase change material and prepolymer compositions are chosen, choices for the prepolymer narrow considerably. Some degree of solubility of the polymer growing at the phase change material surface in the solvent is beneficial. Too great of a solubility, however, will not encourage the polymer to remain at the phase change material surface as it forms. Of course, the solvent must not interact with the phase change material. Cyclohexane was the preferred solvent for the prepolymer, made with polybutadiene and TDI and used to encapsulate CARBOWAX ® polyethylene glycol 8000 and salt hydrates.

Dibutyltin dilaurate catalyst gave good results. Without the catalyst, coherent polymer films did not form around the phase change material particles. There is not any significant difference in the durability of resulting films over the concentration range of 0.004 to 0.08 weight percent of catalyst in the prepolymer solution. Any suitable or conventional catalyst can be used in a catalytic amount. Other suitable catalysts include tributyl tin chloride, stannous tartrate, ferric chloride, titanium tetrachloride, boron trifluoridediethyl ether complex, or tin salts of fatty acids such as tin laurate, myristate, etc.

An inherent advantage of the interfacial polymerization of the invention is its rapid pace at room temperature. Though an even faster rate occurs at higher temperatures, 25° C. is the safe upper limit when dealing with salt hydrates since it assures their remaining solid throughout the encapsulation.

Concerning reaction time, for example, using a polybutadiene/TDI prepolymer (NCO/OH=2/1) in cyclohexane at a concentration of 4 weight percent, the reaction times from two to fifteen minutes gave satisfactory results with respect to shell formation. Five minutes was optimal. At shorter times, the percentage of encapsulated particles developing leaks during freeze/thaw cycling increased. At longer times, the particles began to agglomerate in an "ebulating reactor".

Shortcomings of the normal approach to interfacial polymers led to the development of the unconventional but successful method of the invention. By encapsulating the phase change material while it is in the solid state, at least the following advantages are achieved: (a) The monomer linking agent (that is, reactive component no. 1), as long as it wets the phase change material will coat the solid, phase change material particle, thus giving higher surface concentrations of this component than are possible when it is solubilized in the phase change material; (b) The thickness of reactive component no. 1 can be controlled which in turn controls the thickness of the polymer shell; (c) With the phase change material in its solid state, its interaction with reactive component no. 1 is substantially reduced, which is an especially important advantage when reactive component no. 1 is a diamine or diamine mixture and the phase change material is a salt hydrate; (d) Encapsulation of larger phase change material particles is simplified with the phase change material in its more dimensionally stable form as a solid rather than in the form of a molten droplet; and (e) The desired particle size of the solid phase change material can be preselected and will not change through the course of the encapsulation.

The invention involves the formation of a polymer film or shell around solid phase change material particles via interfacial polymerization.

Encapsulation methods employing the versatile technique of interfacial polymerization of the invention have many advantages. In many cases the reaction is rapid even at room temperature. Usually the reaction can take place in the presence of air. Polymer formation, furthermore, is relatively insensitive to the stoichiometry of the reactive components.

In the invention, aqueous-soluble phase change materials can be encapsulated utilizing interfacial polymerization, something that has not been achieved before. The invention process can be used with polar phase change materials, e.g., CARBOWAX ® polyethylene glycol 8000, and nonpolar phase change materials, e.g., paraffins.

The invention method is quite insensitive to the substrate, i.e., phase change materials, to be encapsulated. Coherent, elastomeric films formed readily over particles of urea, polyethyleneoxide (CARBOWAX ® polyethylene glycol 8000) and different inorganic salt hydrates. Multiple layers can also be formed using the invention method.

The "ebulating reactors" of the invention permit successful encapsulation of large phase change material particles that was not possible in more standard stirred reactors.

Other attempts to encapsulate phase change materials have not proven that in situ encapsulation methods can be performed without reducing the material's heat of fusion. The injection of molten salt hydrate into hollow fibers does not constitute in situ encapsulation because there is no in situ polymerization to form the hollow fibers around the salt hydrate.

Hydrocarbon and silicone fluids, even when saturated with water, are excellent heat transfer fluids for use with encapsulated water sensitive phase change material such as CARBOWAX ® polyethylene glycol 8000 and salt hydrates. Silicone fluid is cost competitive with ethylene glycol/water as a solar collector heat transfer fluid owing to its maintenance-free characteristics. In addition to their use in an "active" heat transfer mode, the invention encapsulated phase change material is also effective in "passive" applications. For example, they can be incorporated into building materials such as cement or plastic blocks and tubes and thus become an integral part of ceilings, walls and floors.

The invention further involves an ebulating reactor for forming a continuous, elastomeric, condensation polymeric shell on small, solid phase change material particles from a first reactive monomer, which is in a liquid state, coated on the small, solid particles and a second reactive monomer, which is in a liquid state. The reactor includes reservoir means for the liquid-state second reactive monomer. The reservoir means has at least one opening in the bottom portion thereof. There is means for supplying an inert gas to the at least one opening in the bottom portion of the reservoir means. There is also means for introducing at least one of the coated solid particles into the liquid-state second reactive monomer. Means for introducing the inert gas via the at least one opening into the liquid-state second reactive monomer in the form of a stream of bubbles is provided. The bubbles raising through the liquid-state second reactive monomer thereby agitate the coated solid particles and keep the coated solid particles from touching the bottom and sides of the reservoir means. Preferably the reservoir means is a trough having a series of in-line, evenly-spaced, ports along one wall (the bottom portion thereof).

By way of summary, the invention process allows the preparation of encapsulated phase change materials without any significant loss in the latent heat of fusion of such phase change material. The invention provides encapsulated phase change materials for thermal energy storage. The invention apparatus allows preparation of such encapsulated phase change materials.

Figure 1:
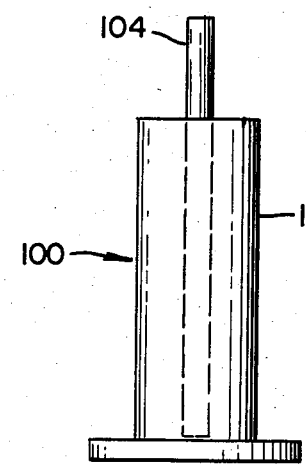
FIG. 1 is an elevational side view of apparatus for producing large salt hydrate particles.

| Terms and Definitions | | |
|---|---|---|
| (1) | Span TM 80 | of ICI Americas Inc. is sorbitan monooleate, a nonionic surfactant. |
| (2) | CARBOWAX ® polyethylene glycol 8000 | of Union Carbide Corporation is a solid polyethylene glycol having a molecular range of 7,000 to 9,000. |
| (3) | L-45 (10cS) | of Union Carbide Corporation is a silicone fluid. |
| (4) | SYNFLUID TM (8cS) | of Gulf Corp. is a polyalphaolefin. |
| (5) | Poly BD TM R-45HF | of ARCO Company is a poly- |

| -continued | | |
|---|---|---|
| Terms and Definitions | | |
| | | butadienediol. |
| (6) | Mondur TM TD-80 | of Mobay Corp. is a toluene diisocyanate isomeric blend. |
| (7) | Cabosil TM M-5 | of Cabosil Industries is fumed silica particles. |

DETAILED DESCRIPTION OF THE INVENTION

As used herein all parts, percentages, ratios and proportions are on a weight basis unless otherwise stated herein or otherwise obvious herefrom to one skilled in the art.

The solid phase change material can be any suitable material that changes from the solid state to the molten state and vice versa within the desired range of usage, and that has a relatively high heat of fusion. The melting point of salt hydrates preferably falls within the range of 30° to 40° C. and of polyethylene glycols and crystalline paraffins preferably falls within the range of 60° to 70° C. Typically solid phase change materials are salt hydrates, crystalline polymers, napthalene, and crystalline paraffins.

The phase change material can be crystalline polymers, such as crystalline polyvinylidene chloride), CARBOWAX ® polyethylene glycol 8000 (preferred), and high density polyethylene. Crystalline polymers such as high density polyethylene are primarily linear without many branches. Even low molecular weight linear polymers are often crystalline and can be used. Crosslinking to any degree or significant branching will prevent a polymer from being crystalline. Semicrystalline materials which have a transition temperature range in the appropriate level can be used.

The phase change material can be the solid polyethylene glycols which are crystalline. CARBOWAX ® is the registered trademark of Union Carbide Corporation for a series of polyethylene glycols. The polyethylene glycols have the general formula $H(OCH_2CH_2)_nOH$. An n of 76 to 80 will provide a solid material at room temperature. The CARBOWAXs ® are followed by numbers which correspond to their average molecular weight. Useful crystalline CARBOWAXs ® include: CARBOWAX ® polyethylene glycol 3350, which has a melting point of 54° to 58° C., a heat of fusion of 37 cal. per g and is solid at room temperature; CARBOWAX ® polyethylene glycol 4600, which has a melting point of 57 to 61° C.; CARBOWAX ® polyethylene glycol 8000, which has a melting point of 60° to 63° C., a heat of fusion of about 40 cal. per g and an n of about 180; and CARBOWAX ® polyethylene glycol 14,000, which has a melting point of 61° to 67° C.

The phase change material can be salt hydrates, such as $CaCl_2.6H_2O$, $Na_2HPO_4.12H_2O$, $Na_2SO_4.10H_2O$, $Ca(NO_3)_2.4H_2O$, $Na_2CO_3.10H_2O$ and $Na_2S_2O_3.5H_2O$. The use of alkali metal salt hydrates are advantageous as the solid phase change material. The preferred salt hydrate is $CaCl_2.6H_2O$, which loses four water molecules at 30° C. Eutectic mixtures of salt hydrates can be used.

Other examples of the phase change material are naphthalene (m.p. is 80.2° C.) and crystalline paraffins. Examples of useful crystalline paraffins are Paravan 4450 (made by Exxon Corporation) which has a melting point of 71° C. and a heat of fusion of 47 cal. per g, Slack Wax 3645 (made by Exxon Corporation) which has a melting point of 60° C. and a heat of fusion of 44 cal. per g, and Slack Wax 3663 (made by Exxon Corporation) which has a melting point of 71° C. and a heat of fusion of 30 cal. per g. The Slack Waxs contain a minor amount of an oil fraction.

A method of making small particles of phase change material is illustrated below in Example 1.

Large particles of salt hydrates normally contain void space when they are prepared by thermal quenching whether in liquid nitrogen, on a bed of dry ice, on a cold polytetrafluoroethylene plate, in cold n-hexane or in cold silicone fluid. If encapsulation of the particles involves their immersion in a fluid phase or even their being coated with an only temporarily fluid phase, imbibition of the fluid into the particle pores can occur. When salt hydrate particles, whose pore space had not been filled with a nonreactive material, such as n-hexane or silicone fluid, interacted with the fluid surrounding them, they were irreversibly altered. To prevent such invasion of the pore space by fluids that react with the salt hydrate, the space can first be filled with an inert material. The method of filling the pore space with nonreactive material can itself, however, adversely affect the salt hydrate particle. The removal of waters of hydration needs to be avoided because such may raise the melting point of the salt hydrate. Such problems can be avoided by the technique of quenching molten salt hydrate in non-reactive fluids, such as n-hexane or silicone fluid. This protects the solid metal hydrate particles from atmospheric moisture and allows them subsequently to readily be coated and immersed in reactive fluids.

The invention process is particularly useful for encapsulating larger particles [1.0 < diameter (mm) < 10.0] of solid phase change material.

The condensation polymeric shells are preferably prepared by the condensation polymerization reaction of a reactive monomer (reactive component no. 1) and a prepolymer (reactive component no. 2), although a condensation reaction between two or more monomers, etc., can be used. The prepolymer usually provides the elastomeric or flexible segments of the polymer, although they can be cross-linked to a certain degree. The condensation polymerization is done in situ.

Condensation polymerization, or polycondensation, forms a polymer by a condensation reaction between two types of monomers (molecules) which repeatedly combine with the separation of water, alcohol or other simple substance.

A wide variety of methods for coating solid phase change material particles with a reactive monomer (reactive component no. 1) can be used, including coating them while they are in a dispersion, as is advantageous for small particles, and roll coating and other applications for larger particles. The particles can even be individually coated.

The reactive monomer can be any suitable reactive monomer, such as monomers having two (reactive) amino groups, monomers having two terminal hydroxyl groups, etc.

The reaction rate of isocyanates with amines is much faster than the reaction of isocyanates with hydroxyl-terminated molecules. Thus, amines and amine mixtures are favored for reactive component no. 1. While polymeric coatings result whether reactive component no. 1 is all ethylene diamine or all triethylenetetraamine, a weight ratio of 25/75 ethylenediamine-triethylenetetraamine provided the most durable polymers shells.

When either of the reactive monomers is a diamine, the diamine can be any of the aromatic, aliphatic or heterocyclic compounds containing two primary or secondary amine groups, preferably separated by at least two carbon atoms. The diamines can be substituted if desired with various noninterfering (nonfunctional) substituents such as ether radicals, thioether radicals, tertiary amino groups, sulphone groups, fluorine atoms, etc. Typical compounds in this category are listed below merely by way of illustration and not by way of limitation: ethylene diamine, trimethylene diamine, tetramethylene diamine, hexamethylene diamine, octamethylene diamine, decamethylene diamine, N,N'-dimethyl-1,6-hexanediamine, 1,4-diamino cyclohexane, 1,4-bis(aminomethyl) cyclohexane, 2,2'-diaminodiethyl ether, 2,2'-diaminodiethyl sulfide, bis(4-aminocyclohexyl) methane, N,N'-dimethyl-2,2,3,3,4,4-hexafluoropentane- 1,5-diamine, ortho-phenylene diamine, meta-phenylene diamine, para-phenylene diamine, benzidine, xylylene diamine, m-toluylene diamine, ortho-tolidine, piperazine, and the like. If desired, mixtures of different diamines may be used. It is generally preferred to use aliphatic alpha, omega diamines, particularly of the type:

$$H_2N-(CH_2)_n-NH_2$$

wherein n has a value of 2 to 12, preferably 6 to 10.

Polyamines, such as triethylenetetraamine, can be used as one of the reactive monomers.

An example of a mixture of reactive amine monomers is ethylenediamine-triethylenetetraamine (preferred and most preferably in a weight ratio of 25 to 75).

When either of the reaction monomers is a diol, the diol has two terminal hydroxyl groups and can be any of the aliphatic, aromatic or heterocyclic compounds containing two hydroxy groups, preferably separated by at least two carbon atoms. The diols can be substituted if desired with various noninterfering (nonfunctional) substituents such as ether groups, sulphone groups, tertiary amine groups, thioether groups, fluorine atoms, etc. Typical compounds which can be used are listed below merely by way of illustration and not limitation: ethylene glycol, diethylene glycol, 2,2-dimethyl propane-1,3-diol, propane-1,3-diol, butane-1,4-diol, hexane-1,6-diol, octane-1,8-diol, decane-1,10-diol, dodecane-1,12-diol, butane-1,2-diol, hexane-1,2-diol, cyclohexane-1,4-diol, hydroquinone, resorcinol, catechol, bis(parahydroxyphenyl) butane, 4,4'-dihydroxybenzophenone, naphthalene-1,5-diol, biphenyl-4,4'-diol, 2,2-bis(3-methyl-4-hydroxyphenyl) propane,2-2-bis(3-isopropyl-4-hydroxyphenyl) propane, 2,2-(4-hydroxy-dibromophenyl) propane, etc.

If desired, mixtures of different diols can be used. It is also within the purview of the invention, though less preferred, to use the compounds containing more than two hydroxy groups, for example, glycerol, diglycerol, hexanetriol, pentaerythritol, etc. Moreover, it is within the scope of the invention to utilize the sulphur analogues of the diols. Thus, for example, instead of using the compounds containing either (a) two —SH groups or (b) one —SH group and one —OH group.

Among the preferred compounds are the aliphatic diols, for example, those of the type:

wherein n has a value from 2 to 12. Another preferred category of aliphatic compounds is the polyethylene glycols, i.e.:

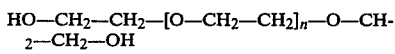

wherein has a value from zero to 10. A preferred category of aromatic diols are the bisphenols, that is, compounds of the type:

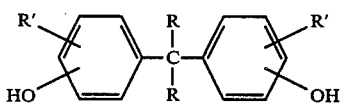

wherein R—C—R represents an aliphatic hydrocarbon group containing 1 to 12 carbon atoms and R' represents hydrogen or a lower alkyl radical. In this category especially preferred compounds are 2,2-bis(parahydroxyphenyl) propane, often designated as bisphenol-A; 2,2-bis(3-methyl-4-hydroxyphenyl) propane; 2,2-bis(3-isopropyl-4hydroxyphenyl) propane; and brominated derivatives of bisphenol A, such as 2,2-bis(4-hydroxydibromophenyl) propane.

When either of the reactive monomers is a diacid chloride, the diacid chloride can be any of the aliphatic, aromatic, or heterocyclic compounds containing two carbonylchloride (—COCl) groups, preferably separated by at least two carbon atoms. The diacid chlorides can be substituted if desired with non-interfering (non-functional) substituents, such as ether groups, thioether groups, sulphone groups, etc. Typical examples of compounds in this category are listed below merely by way of illustration and not limitation: oxalyl chloride, maleyl chloride, fumaryl chloride, malonyl chloride, succinyl chloride, glutaryl chloride, adipyl chloride, pimelyl chloride, suberyl chloride, azelayl chloride, sebacyl chloride, cyclohexane-1,4-biscarbonyl chloride, phthalyl chloride, isophthalyl chloride, terephthalyl chloride, 4,4'-biphenyl-dicarbonyl chloride, β-hydromuconyl chloride, i.e., ClCO—CH₂—CH=CH—CH₂—COCl, diglycollic acid chloride, i.e., O(CH₂—COCl)₂, higher homologues of this compound such as O(CH₂—CH₂—COCl)₂, dithiodiglycollic acid chloride, diphenylolpropanediacetic acid chloride, i.e., (CH₃)₂(C₆H₄OCH₂COCL)₂, and the like. Mixtures of different diacid chlorides can be used. The sulfur analogues of these compounds can be used and are included within the scope of the invention. Thus, instead of using compounds containing two —COCl groups, one can use compounds containing one —CSCl and one —COCl group or compounds containing two —CSCl groups. Moreover, although the diacid chlorides are preferred as they are reactive and relatively inexpensive, the corresponding bromides and iodides can be used.

As the diacid chloride, it is generally preferred to use the aliphatic compounds containing two carbonylchloride groups in alpha, omega positions, particularly those of the type:

wherein n has a value from 2 to 12. Another preferred category includes the compounds of the formula ClCO—A—COCl (wherein A is the benzene or cyclohexane radical), especially para-substituted compounds such as terephthalyl and hexahydroterephthalyl chlorides.

When either of the reactive monomers is a bischloroformate, the bischloroformate can be any of the aliphatic, aromatic, or heterocyclic compounds containing two chloroformate groups:

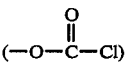

preferably separated by at least two carbon atoms. The bischloroformates can be substituted with non-interfering (non-functional) substituents such as sulfone groups, ether groups, thioether groups, etc. Typical examples of compounds in this category are listed below merely by way of illustration and not limitation: ethylene glycol bischloroformate, diethylene glycol bischloroformate, 2,2-dimethyl propane, 1,3-diol bischloroformate, propane-1,3-diol bischloroformate, butane-1,4-diol bischloroformate, hexane-1,6-diol bischloroformate, octane-1,8-diol bischloroformate, decane-1,10-diol bischloroformate, butane-1,2-diol bischloroformate, hexane-1,2-diol bischloroformate, 2-methoxyglycerol-1,3-bischloroformate, glycerol-1,2-bischloroformate, glycerol-1,3-bischloroformate, diglycerol bischloroformate, hexanetriol bischloroformate, pentaerythritol bischloroformate, cyclohexane-1,4-diol bischloroformate, hydroquinone bischloroformate, resorcinol bischloroformate, catechol bischloroformate, bischloroformate of 2,2-bis(parahydroxyphenyl) propane, bischloroformate of 2,2-bis(parahydroxyphenyl) butane, bischloroformate of 4,4'-dihydroxybenzophenone, bischloroformate of 1,2-bis(parahydroxyphenyl) ethane, naphthalene-1,5-diol bischloroformate, biphenyl-4,4'-diol bischloroformate, etc. Mixtures of different bischloroformates can be used.

Among the preferred compounds are the aliphatic bischloroformates, for example, those of the type:

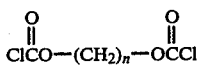

wherein n has a value from 2 to 12. Another preferred category of compounds are the bis-chloroformates derived from polyethylene glycols, e.g.:

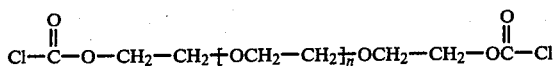

wherein has a value from zero to 10. A useful category of aromatic bischloroformates are the bisphenol chloroformates, that is, compounds of the type:

wherein R—C—R represents an aliphatic hydrocarbon group containing 1 to 12 carbon atoms and R' is hydrogen or a low alkyl radical.

The sulfur analogues of the bischloroformates can be used and such are included within the spirit of the invention. Thus, instead of using the compounds containing two:

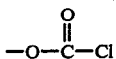

groups one can use any of the compounds containing the sulfur analogues of these groups, for example, the compounds containing two groups of the formula:

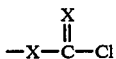

wherein one X is sulfur and the other is oxygen or wherein both X's are sulfur. Moreover, although the bischloroformates are preferred because they are reactive and relatively inexpensive, it is not essential that they contain chlorine and the corresponding bisbromoformates or bisiodoformates can be used.

When either of the reactive monomers is a diisocyanate, the diisocyanate can be any of the aliphatic, aromatic, or heterocyclic compounds containing two isocyanate (—NCO) groups, preferably separated by at least two carbon atoms. The diisocyanates can be substituted, if desired, with non-interfering (non-functional) substituents such as ether groups, thioether groups, sulfone groups, etc. Typical examples of compounds in this category are listed below merely by way of illustration and not limitation: ethylene diisocyanate, propylene diisocyanate, butylene diisocyanate, trimethylene diisocyanate, tetramethylene diisocyanate, hexamethylene diisocyanate, octamethylene diisocyanate, decamethylene diisocyanate, cyclohexylene diisocyanate, bis(2-isocyanatoethyl) ether, bis(2-isocyanatoethyl) ether of ethylene glycol, o-phenylene diisocyanate, m-phenylene diisocyanate, p-phenylene diisocyanate, tolyene-2,4-diisocyanate, tolylene-2,6-diisocyanate, 3,3-bitolylene-4,4'-diisocyanate, i.e.,

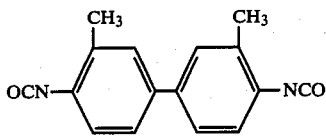

diphenyl ether-4,4'-diisocyanate, i.e.,

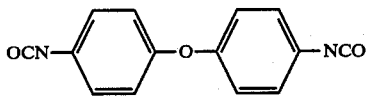

3,5,3',5'-bixylylene-4-4'disocyanate, i.e.,

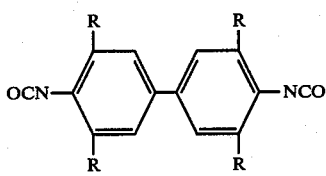

(R is —CH3)

diphenylmethane-4,4'-diisocyanate, i.e.,

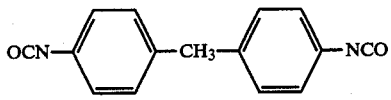

biphenylene diisocyanate, 3,3'-dimethyoxy-biphenylene-4'-diisocyanate, naphthalene diisocyanates, polymethyl polyphenyl isocyanates, etc. It is also evident that the sulfur analogues of these compounds can be used and such are included within the spirit of the invention. Thus, for example, instead of using the compounds containing two —NCO groups can use their analogues containing either two —NCS groups or one —NCO group and one —NCS group. Another point to be made is that it is within the scope of the invention to utilize the derivatives which yield the same products with compounds containing active hydrogen as do the isocyanates. Particular reference is made to the biscarbamyl chlorides which can be used in place of the diisocyanates. Thus one can use any of the above-designated compounds which contain carbamyl chloride groups:

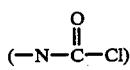

or their sulfur analogues:

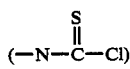

in place of the isocyanate groups.

Among the preferred compounds are the aliphatic diisocyanates, for example, those of the type $$OCN-(CH_2)_n-NCO$$

wherein n has a value from 2 to 12. Other preferred compounds are the toluene diisocyanates, xylylene diisocyanates, and diphenylmethane-4,4′-diisocyanate which can also be termed methylene-bis(p-phenylisocyanate).

The condensation polymer includes the condensation polymers wherein the recurring structures contain at least one non-oxo group, that is, a group of the structure:

$$-\overset{\overset{Z}{\|}}{C}-$$

wherein Z is sulfur or oxygen. The term "non-oxo" is used in the normal sense of excluding aldehydes and ketone configurations. Illustrative examples of the non-oxo carbonyl group are the amide group, the urethane group, the urea group, the ester group and the carbonate group.

When below, and elsewhere herein, R, R′, R″ and/or R‴ are bivalent organic radicals, examples thereof include diamines, diacid chlorides, other diacid halides, diols, diisocyanates, bischloroformates, and mixtures thereof.

The condensation polymer can be a polyurethane wherein the recurring structures contain at least one urethane group, that is, a group of the structure:

$$-Z-\overset{\overset{Z}{\|}}{C}-\overset{}{\underset{|}{N}}-$$

wherein Z is sulfur or oxygen.

In preparing the polyurethane, one of the reactive monomers can be a prepolymer containing internal urethane units and terminal amino groups. Such prepolymers can be prepared, for example, in a known manner by reacting a molar excess of diamine with a bischloroformate. The prepolymer can then be used as one of the reactive monomers while the other reactive monomer can be a bischloroformate. A typical example in this area is to use, as one of the reactive monomers, a prepolymer of the type:

$$H_2N-R-NH\overset{\overset{O}{\|}}{C}-O-R'-O-\overset{\overset{O}{\|}}{C}-NH-R-NH_2$$

and to use, as the other reactive monomer, a bischloroformate:

(ClCOOR″OOCCl)

to produce a polymer containing repeating units of the type:

$$-NH-R-NH-\overset{\overset{O}{\|}}{C}-O-R'-O-\overset{\overset{O}{\|}}{C}-NH-R-NH-\overset{\overset{O}{\|}}{C}-O-R''-O-\overset{\overset{O}{\|}}{C}-$$

In these formulas, R, R′, and R″ represent bivalent organic radicals.

In the alternative, one of the reactive monomers can be a prepolymer containing internal urethane units and external:

$$-O\overset{\overset{O}{\|}}{C}-Cl$$

groups. Such a prepolymer used as one of the reactive monomers in conjunction with a diamine as the other reactive monomer yields a polyurethane similar to that shown above.

There is a very wide choice available in the selection of the complementary monomers (e.g., diamine and bischloroformate) so that generically the polyurethanes forming the shell around the phase change material, contain repeating units of the type:

$$-N-R-N-\overset{\overset{Z}{\|}}{\underset{\underset{X}{\|}}{C}}-Z-R'-Z-\overset{\overset{Z}{\|}}{\underset{\underset{X}{\|}}{C}}-$$

wherein: R and R′ are bivalent organic radicals; Z represents an oxygen or sulfur atom; and the X's taken separately represent two hydrogen atoms or two monovalent organic radicals, or, taken together the X's represent a single bivalent organic radical which links the two nitrogen atoms to which they are attached.

The condensation polymer can be a polyurea wherein the recurring structures contain at least one urea group, that is, a group of the structure:

$$-NH-\overset{\overset{Z}{\|}}{C}-NH-$$

wherein Z is sulfur or oxygen.

In preparing the polyurea, one of the reactive monomers can be a prepolymer containing internal urea units and terminal amino groups. Such prepolymers can be prepared, for example, in a known manner by reacting a molar excess of diamine with a diisocyanate. The prepolymer can then be used as one of the reactive monomers, while the other reactive monomer can be a diisocyanate. A typical example of procedure in this area would be to use, as one of the reactive monomers, a prepolymer of the type:

$$H_2N-R-NH-\overset{\overset{O}{\|}}{C}-NH-R'-NH-\overset{\overset{O}{\|}}{C}-NH-R-NH_2$$

and to use, as the other reactive monomer, a diisocyanate (OCN—R″—NCO)

to produce a polymer containing repeating units of the type:

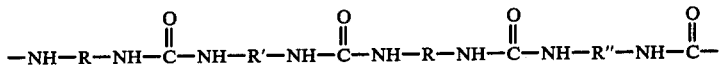

In these formulas, R, R' and R" represent bivalent organic radicals.

In the alternative, one of the reactive monomers can be a prepolymer containing internal urea units and terminal isocyanate groups. Such a prepolymer used as one of the reactive monomers in conjunction with a diamine as the other reactive monomer would yield a polyurea similar to that shown above.

There is a very wide choice available in the selection of the complementary monomers so that, generically, the polyureas forming the shell around the phase change material will contain repeating units of the type:

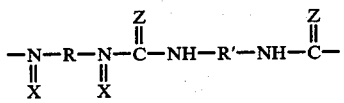

wherein: R and R' represent bivalent organic radicals; Z represents oxygen or sulfur; and the X's taken separately represent two hydrogen atoms or two monovalent organic radicals, or, taken together, the X's represent a single divalent organic radical linking the two nitrogen atoms to which these are attached.

The condensation polymer can be a polyester wherein the recurring structures contain at least one ester group, that is, a group of the structure:

wherein Z is sulfur or oxygen.

In preparing the polyester, one of the reactive monomers can be a prepolymer containing internal ester units and terminal hydroxy groups. Such prepolymers can be prepared, for example, in a known manner by reacting a molar excess of diol with a diacid chloride. The prepolymer can then be used as one of the reactive monomers, while the other reactive monomer can be a diacid chloride. A typical example in this area is to use, as one of the reactive monomers, a prepolymer of the type:

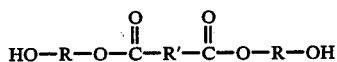

and to use, as the other reactive monomer, a diacid chloride:

(ClCOR"COCl)

to produce a polyester containing repeating units of the type:

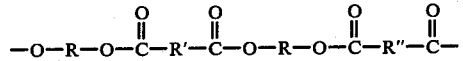

In these formulas R, R' and R" represent bivalent organic radicals.

In the alternative, one of the reactive monomers can be a prepolymer containing internal ester units and terminal carbonylchloride groups. Such a prepolymer used as one of the reactive monomers in conjunction with a diol as the other reactive monomer yields a polyester similar to that shown above.

There is a very wide choice available in the selection of the complementary monomers so that, generically, the polyesters forming the shell around the phase change material will contain repeating units of the type:

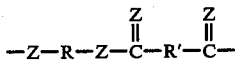

wherein R represents a bivalent organic radical; Z represents an oxygen or sulfur atom; and R' represents a bivalent organic radical or a bond linking the two carbonyl groups.

The condensation group can be a polyamide wherein the recurring structures contain at least one amide group, that is, a group of the structure:

wherein Z is sulfur or oxygen.

In preparing the polyamide, one of the reactive monomers can be a prepolymer containing internal amide units and terminal amide groups. Such prepolymers can be prepared, for example, by reacting in a known manner a molar excess of diamine with a diacid chloride. The prepolymer can then be used as one of the reactive monomers, while the other reactive monomer can be a diacid chloride. A typical example of procedure in this area is to use, as one of the reactive monomers, a prepolymer of the type:

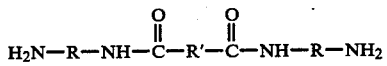

and to use, as the other reactive monomer, a diacid chloride:

(ClCOR"COCl)

to produce a polyamide containing repeating units of the type:

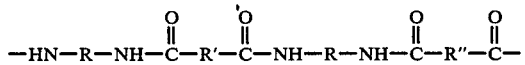

In these formulas, R, R' and R" represent bivalent organic radicals.

In the alternative, one of the reactive monomers can be a prepolymer containing internal amide groups and terminal carbonylchloride (—COCl) groups. Such a prepolymer used as one of the reactive monomers in conjunction with a diamine as the other reactive monomer will yield a polyamide similar to that shown above.

There is a very wide choice available in the selection of the complementary monomers (e.g., diamine and diacid chloride) so that, generically, the polyamides forming the shell around the phase change material will contain repeating units of the type:

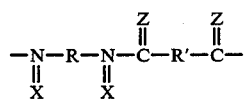

wherein: R represents a bivalent organic radical; Z represents an oxygen or sulfur atom; R' represents a bivalent organic radical or a bond linking the two carbonyl groups; and the two X's taken separately represent two hydrogen atoms or two monovalent organic radicals, or taken together the X's represent a single bivalent organic radical linking the two nitrogen atoms to which they are attached.

The condensation polymer can be a polycarbonate wherein the recurring structures contain at least one carbonate group, that is, a group of the structure:

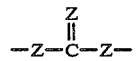

wherein Z is sulfur or oxygen.

In preparing the polycarbonate, one of the reactive monomers can be a prepolymer containing internal carbonate units and terminal hydroxy groups. Such prepolymers can be prepared, for example, in a known manner by reacting a molar excess of diol with a bischloroformate. The prepolymer can then be used as one of the reactive monomers, while the other reactive monomer can be a bischloroformate. A typical example in this area is to use, as one of the reactive monomers, a prepolymer of the type:

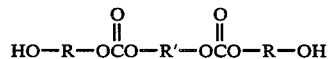

and to use, as the other reactive monomer, a bischloroformate:

to produce a polycarbonate containing repeating units of the type:

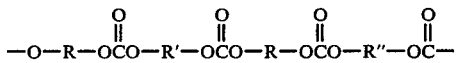

In these formulas, R, R' and R" represent organic radicals.

In the alternative, one of the reactive monomers can be a prepolymer containing internal carbonate units and terminal —OC(O)Cl groups. Such a prepolymer used as one of the reactive monomers in conjunction with a diol as the other reactive monomer will yield a polycarbonate similar to that shown above.

There is a very wide choice available in the selection of the complementary monomers so that, generically, the polycarbonates forming the shell around the phase change material will contain repeating units of the type:

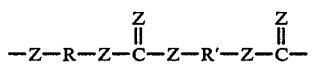

wherein Z represents an oxygen or sulfur atom; and R and R' represent bivalent organic radicals.

The condensation polymer includes condensation interpolymers which contain in their recurring structural elements at least two different units selected from the category of amide, urethane, urea, ester and carbonate units, these units being linked together through carbon atoms. The types of different units in the interpolymer are determined by the monomers used.

The condensation interpolymers produced in accordance with the invention can be described as interpolymers wherein the recurring structures contain at least two different units of the category amide, urethane, urea, ester and carbonate, such units being linked through carbon atoms. These interpolymers can thus be designated by the formulae:

(a) two different units: $-X^1-Q-X^2-$,
(b) three different units: $-X^1-Q-X^2-Q-X^3-$,
(c) four different units: $-X^1-Q-X^2-Q-X^3-Q-X^4-$, and
(d) five different units: $-X^1-Q-X^2-Q-X^3-Q-X^4-Q-X^5-$ wherein $X^1$, $X^2$, $X^3$, $X^4$ and $X^5$ represent the different units (e.g., amide, urethane, urea, ester, or carbonate) and Q represents the divalent radicals linking the units together. The values of Q, as well as the values of $X^1$, $X^2$, etc., depend on the nature of the reactants chosen for forming the interpolymers. Such reactants can be chosen from a wide variety of categories so that generically Q represents a bivalent organic radical. More specifically, and preferably, the reactants are chosen so that Q represents a bivalent hydrocarbon radical or a bivalent hydrocarbon radical interrupted by internal ether (—O—) linkages and which contains at least two carbon atoms.

The condensation interpolymer can be condensation interpolymers formed using a diamine as one of the reactive monomers. Examples of the types of such interpolymers are (a) copoly(amide-urethane) prepared using a diamine as one of the reactive monomers and a mixture of a diacid chloride and a bischloroformate as the other reactive monomer, (b) copoly(amide-urea) prepared using a diamine as one of the reactive monomers and a mixture of a diacid chloride and a diisocyanate as the other reactive monomer, (c) copoly(urethane-urea) prepared using a diamine as one of the reactive monomers and a mixture of a diacid chloride and a diisocyanate as the other reactive monomer, and (d) copoly(amide-urethane-urea) prepared using a diamine as one of the reactive monomers and a mixture of a diacid chloride, a bischloroformate and a diisocyanate as the other reactive monomer. It is necessary that one of the reactive monomers include (i.e., be composed of) at least two of the classes of bifunctional compounds. So one of the reactive monomers can be, for example, a mixture of diacid chloride and bischloroformate or a mixture of bischloroformate and diisocyanate or a mixture of diacid chloride, bischloroformate and diisocyanate. The relative amounts of these reactants of different class can be varied depending on the character of the interpolymer to be produced. For example, in using a mixture of diacid chloride and bischloroformate as one of the reactive monomers, the proportion of amide to urethane groups in the interpolymer can be increased by increasing the proportion of diacid chloride used in the mixture. In some cases it is best to employ the reagents in equimolar proportions, thus to provide an interpolymer having an equal number of different units. For example, by using an equimolar mixture of a diacid chloride and a bischloroformate as one of the reactive monomers the resultant interpolymer will contain substantially equal numbers of amide and urethane units. However, the use of equimolar mixtures is by no means critical and one can use, for example, any mixture containing 10 to 90 percent (molar basis) of the reagent of one class and the remainder (90 to 10 percent) of the reagents of the other classes.

Numerous variations in procedure are obvious herefrom to those skilled in the art in the application of this embodiment of the invention, without departing from the fundamentals of the invention.

A prepolymer containing internal amide (or urethane or urea) units and terminal amino groups can be prepared. Such prepolymers can be prepared, for example, by reacting in a known manner a molar excess of diamine with a diacid chloride, bischloroformte, or diisocyanate. The prepolymer can then be used as one of the reactive monomers, while for the other reactive monomer one can use any one of the reagents (diacid chloride, bischloroformate or diisocyanate) which was not used in preparting the prepolymer. Thus, taking into account the variation in the internal units of the interpolymer, the following alternatives are among those possible for the interpolymer: (a) copoly(amide-urethane) prepared using a prepolymer containing internal amide units and terminal amino groups as one of the reactive monomers and a bischloroformate as the other reactive monomer, (b) copoly(amide-urea) prepared using a prepolymer containing internal amide units and terminal amino groups as one of teh reactive monomers and a diisocyanate as the other monomer, (c) copoly-(urethane-amide) prepared using a prepolymer containing internal urethane units and terminal amino groups as one of the reactive monomers and a diacid chloride as the other reactive monomer, (d) copoly (urethane-urea) prepared using a prepolymer containing internal urethane units and terminal amino groups as one of the reactive monomers and a diisocyanate as the other reactive monomer, (e) copoly(urea-amide) prepared using a prepolymer having internal urea units and terminal amino groups as one of the reactive monomers and a diacid chloride as the other reactive monomer, and (f) copoly(urea-urethane) prepared using a prepolymer containing internal urea units and terminal amino groups as one of the reactive monomers and a bischloroformate as the other reactive monomer.

A typical example of this area would be to use, as one of the reactive monomers, a prepolymer of the type:

and to use, as the other reactive monomer, a diacid chloride:

thus to produce an interpolymer containing amide and urethane units of the type:

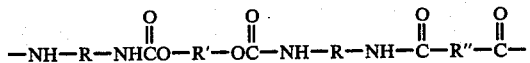

Another typical example in this area would be to use, as one of the reactive monomers, a prepolymer of the type:

and to use, as the other reactive monomer, a diacid chloride:

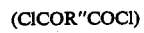

thus to produce an interpolymer containing amide and urethane units of the type:

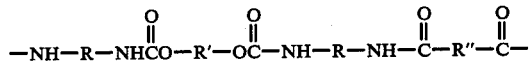

This principle of using prepolymers can be applied in other ways as well. For example, a diol can be condensed in a known manner with an excess of diacid chloride (or bischloroformate) to produce a prepolymer containing internal ester (or carbonate) units and terminal:

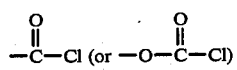

This prepolymer used as one of the reactive monomers in conjunction with a diamine as the other reactive monomer will yield interpolymers containing (a) ester and amide units or (b) carbonate and amide units.

Another variation is to employ as one of the reactive monomers, a bifunctional compound having an appropriate disposition of internal units (amide, urethane, urea, ester, or carbonate) and terminal groups (—COCl, —OC(O)Cl, or —NCO). For example, by using as one of the reactive monomers, a compound containing internal ester units and terminal isocyanate groups of the formula:

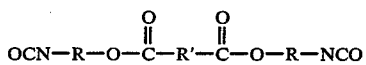

and using $H_2N-R''-NH_2$ as the other reactive monomer, one produces a copoly(ester-urea) containing recurring units of the type:

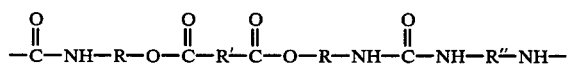

Another example of this system is to use as one of the reactive monomers a compound containing internal carbonate units and terminal isocyanate groups, having the formula:

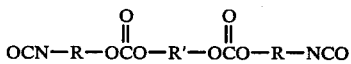

This compound used in conjunction with $H_2N-R''-NH_2$ as the other reactive monomer yields a copoly(carbonate-urea) containing recurring units of the type:

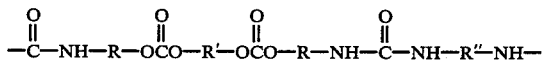

A further example of this system is to employ as one of the reactive monomers a compound containing internal carbonate units and terminal carbonyl chloride groups, having the formula:

This compound used in conjunction with $H_2N-R''-NH_2$ as the other reactive monomer will yield a copoly(carbonateamide) containing recurring units of the type:

The condensation interpolymer can be condensation interpolymers formed using a diol as one of the reactive monomers. Examples of the types of such interpolymers are (a) copoly (ester-carbonate) prepared using a diol as one of the reactive monomers and a mixture of a diacid chloride and a bischloroformate as the other reactive monomer, (b) copoly (ester-urethane) prepared using a diol as one of the reactive monomers and a mixture of a diacid chloride and a diisocyanate as the other reactive monomer, (c) copoly(carbonate-urethane) prepared using a diol as one of the reactive monomers and a mixture of a bischloroformate and a diisocyanate as the other reactive monomer, and (d) copoly (ester-carbonate-urethane) prepared using a diol as one of the reactive monomers and a mixture of a diacid chloride, a bischloroformate and a diisocyanate as the other reactive monomer.

Such condensation interpolymers are attained, for example, by using as one of the reactive monomers a mixture of diacid chloride and bischloroformate or a mixture of diacid chloride and diisocyanate or a mixture of bischloroformate and diisocyanate or a mixture of diacid chloride, bischloroformate, and diisocyanate. All of the information set forth above in describing the compounds suitable for use in the above embodiment, the proportions of these compounds, the conditions of reaction, etc., is equally applicable in this embodiment.

Numerous variations in procedure are obvious herefrom to those skilled in the art in the application of this embodiment of the invention, without departing from the fundamentals of the invention as described herein.

A prepolymer containing internal ester (or carbonate or urethane) units and terminal hydroxy groups can be prepared. Such prepolymers can be prepared, for example, by reacting in a known manner a molar excess of diol with a diacid chloride, bischloroformate, or diisocyanate. The prepolymer can then be used as one of the reactive monomers, while for the other reactive monomer one can use any of the reagents (diacid chloride, bischloroformate, or diisocyanate) which was not used in preparing the prepolymer. Thus, taking into account the variation in the internal units of the interpolymer, the following alternatives are among those possible for the interpolymer: (a) copoly(estercarbonate) prepared using a prepolymer containing internal ester units and terminal hydroxyl groups as one of the reactive monomers and a bischloroformate as the other reactive monomer, (b) copoly(ester-urethane) prepared using a prepolymer containing internal ester units and terminal hydroxyl groups as one of the reactive monomers and a diisocyanate as the other monomer, (c) copoly (carbonate-ester) prepared using a prepolymer containing internal carbonate units and terminal hydroxyl groups as one of the reactive monomers and a diacid chloride as the other reactive monomer, (d) copoly(carbonate-urethane) prepared using a prepolymer containing internal carbonate units and terminal hydroxyl groups as one of the reactive monomers and a diisocyanate as the other reactive monomer, (e) copoly (urethane-ester) prepared using a prepolymer having internal urethane units and terminal hydroxyl groups as one of the reactive monomers and a diacid chloride as the other reactive monomer, and (f) copoly(urethanecarbonate) prepared using a prepolymer containing internal urethane units and terminal hydroxyl groups as one of the reactive monomers and a bischloroformate as the other reactive monomer.

A typical example of this area is to use one of the reactive monomers, a prepolymer of the type:

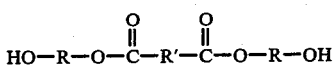

and to use as the other reactive monomer, a bischloroformate:

(Cl(O)COR''OC(O)Cl)

to produce an interpolymer having elements of the structure:

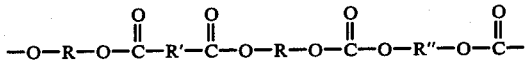

The principle of using prepolymers can be applied in other ways as well. For example, a diol could be condensed in known manner with an excess of diacid chloride and bischloroformate to produce a prepolymer containing terminal:

groups and/or terminal:

groups. This prepolymer used as one of the reactive monomers in conjunction with a diol as the other reactive monomer will yield an interpolymer containing both ester and carbonate units.

The condensation interpolymer can be condensation interpolymers formed using a mixture of a diamine and a diol as one of the reactive monomers. Examples of the types of such interpolymers are (a) copoly(amide-ester) prepared using a diamine as one of the reactive monomers and a diacid chloride as the other reactive monomer, (b) copoly(urethane-carbonate) prepared using a mixture of a diamine and a diol as one of the reactive monomers and a bischloroformate as the other reactive monomer, (c) copoly(urea-urethane) prepared using a mixture of a diamine and a diol as one of the reactive monomers and a diisocyanate as the other reactive monomer, and (d) copoly (amide-urethane-carbonate) prepared using a mixture of a diamine and a diol as one of the diacid chloride and a mixture of a diacid chloride and bischloroformate as the other reactive monomer, and (e) tetrapoly(amide-urethane-urea-ester) prepared using a mixture of a diamine and a diol as one of the reactive monomers and a mixture of a diacid chloride and a diisocyanate as the other reactive monomer.

Any of the diamines and diols set forth above can be used. The relative amounts of diamine and diol which comprise one of the reactive monomers can be varied depending on the character of the interpolymer to be produced. For example, in a system using a diacid chloride as one of the reactive monomers, the proportion of amide to ester units in the interpolymer can be increased by increasing the ratio of diamine to diol in the other reactive monomer.

In some cases it is preferred to employ the diamine and diol in equimolar proportions, thus to provide an interpolymer having any equal proportion of different units. For example, by using an equimolar mixture of diamine and diol as one of the reactive monomers and a bischloroformate as the other reactive monomer, the resultant interpolymer will contain substantially an equal ratio of carbonate and urethane units. However, the use of equimolar proportions is by no means critical and one can use as one of the reactive monomers any mixture containing 10 to 90 percent (molar basis) of diamine and the remainder (90 to 10 percent) of diol.

A diacid chloride, bischloroformate, diisocyanate, or mixtures of these can be used as one of the reactive monomers in this embodiment.

Numerous variations in procedure are obvious herefrom to those skilled in the art in the application of this embodiment of the invention, without departing from the fundamentals of the invention.

A single compound containing terminal hydroxy and amino groups, for example, 2-aminoethanol, 3-aminopropanol, 4-aminobutanol, 6-aminohexanol, 8-aminooctanol, o-aminophenol, m-aminophenol, p-aminophenol, para(4-aminophenyl)phenol, etc., can be used as one of the reactive monomers. Then, by suitable selection of the other reactive monomer, various interpolymers can be formed. Some of the possible alternatives in this system are given below for the interpolymer: (a) copoly(ester-amide) prepared using a component containing terminal amino and terminal hydroxyl groups as one of the reactive monomers and a diacid chloride as the other reactive monomer, (b) copoly(carbonate-urethane) prepared using a compound containing terminal amino and terminal hydroxyl groups as one of the reactive monomers and a bischloroformate as the other monomer, and (c) copoly(urethane-urea) prepared using a compound containing terminal amino and terminal hydroxy groups as one of the reactive monomers and a diisocyanate as the other reactive monomer.

A typical example of this area is to use as one of the reactive monomers a compound of the type HO—A—NH$_2$ (wherein A is the hexamethylene radical) and to use as the other reactive monomer hexane-1,6-diol bischloroformate to produce a copoly(urethane-carbonate) having units of the structure:

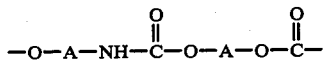

The preferred types of reactive monomers are diamines, diols, diacid chlorides, bischloroformates and their equivalents. Although it is preferred to use these monomers, they are by no means the only compounds which can be used. The invention in its broadest aspect includes the application of many other types of monomers which have the ability to form condensation interpolymer shells by the disclosed and conventional procedures. Various examples are thus set forth of other types of compounds which can be used.

By substituting disulfonyl chlorides for the diacid chlorides, interpolymers can be formed which contain sulfonamide groups. A typical example in this category is the use of a disulfonyl chloride and a bischloroformate to prepare a copoly(sulfonamide-urethane). Any of the diamines and bischloroformates described herein can be used together with a disulfonyl chloride, such as benzene-1,3-disulfonyl chloride, biphenyl-4,4'-disulfonyl chloride, toluene disulfonyl chlorides or aliphatic compounds such as those of the formula:

$$ClSO_2-(CH_2)_n-SO_2Cl$$

wherein n has a value from 2 to 12. An alternative is to use a disulfonyl chloride and a diisocyanate as one of the reactive monomers in conjunction with a diamine as the other reactive monomer to form a copoly(sulfonamide-ureas) shell.

In another plan, a solution of a diol is first applied to the phase change particles followed by application of a disulfonyl chloride and a bischloroformate to form a copoly(sulfonate-carbonate) shell. For this purpose one can use any of the diols, bischloroformates, and disulfonyl chlorides exemplified herein. A variant of this procedure is to use the corresponding dithiol in place of the diol, thus to form a copoly(thiolsulfonatethiolcarbonate).

An alternative to the diacid chlorides is the use of mixed anhydrides of the corresponding dicarboxylic acids with monobasic acids such as trifluoroacetic acid, dibutylphosphoric acid, or the like. Such mixed anhydrides can be employed, for example, as one of the reactive monomers in the same manner as described for the diacid chlorides.

Another approach is to use, one of the reactive monomers, a mixture of a diamine and a compound such as urea, thiourea, biuret, dithiobiuret, or guanidine. Such a mixture used in conjunction with a diacid chloride or disulfonyl chloride, as the other reactive monomer, will form such interpolymer shells as copoly(amide-urea), copoly(amide-thiourea), copoly(sulfonamide-urea) and the like.

The viscosity of reactive component no. 1 (that is, the prepolymer or monomer coated on the solid phase change material particles) can be adjusted to optimize the invention encapsulation process with respect to the integrity of the polymeric particles that effused molten phase change material when placed on a hot plate, as was done to test the CARBOWAX® polyethylene glycol 8000 particles, or when submerged in 50° C. silicon fluid, as was done with solid salt hydrate particles. Inert thickeners, such as, clays, can be used to thicken reactive component no. 1, but fumed silica particles (such as Cabosil M-5) gave very favorable results. Concentrations of silica above 5 weight percent made the amine mixture (25/75 ethylenediamine-triethylenetetramine, weight basis) an unwieldy paste. A concentration of 5 weight percent of Cabosil M-5 in the same amine mixture gave excellent results with both CARBOWAX® polyethylene glycol 8000 and salt hydrate particles. A lower concentration resulted in thinner amine coverage of the phase change material particles. Examples of useful inert thickeners are bentonite, silicates, and colloidal silica.

The prepolymer can basically be any prepolymer which is flexible (that is, results in an elastomeric polymer) and has at least two terminal reactive groups, such as, isocyanate groups.

The flexible (elastomeric) portion of the prepolymer is preferably a diol moiety or mixture of diol moieties.

Examples of preferred prepolymers are a castor oil, a silicone oil, a polycaprolacetone, a polytetramethylene glycol and a polybutadiene diol. The polybutadiene segment confers very good hydrolytic stability. The castor oil and the polytetramethylene glycol are good in this respect; also, the castor oil is the least expensive of the materials. The silicone flexible (elastomeric) segment exhibits very good hydrolytic stability although coatings made with it are quite permeable to water; it had better thermal stability than the other flexible segments.

Prepolymers made with $H_{12}MDI$ have superior hydrolytic stability. Those made with toluene-2,4-diisocyanate (TDI) showed the fastest reaction rates.

The prepolymer can also be terminated with epoxide groups, namely:

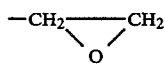

which reacts with diamines (the reactive monomer) on the phase change material polymers to produce polymeric shells.

The in situ polymerization is conducted in the presence of a nonreactive solvent or diluent. The solvent can be water or nonaqueous solvents which dissolve the prepolymer but do not dissolve the phase change material. Example of useful solvents are water, alcohols such as methanol, ethanol, propanol, butanol, isopropanol and isobutanol, carbon tetrachloride, other halogen derivatives of hydrocarbons such as chloroform, trichloroethylene, ethylene dichloride and ethylene chlorobromide, benzene, benzene homologs or substituted benzene compounds such as xylene, toluene, chlorobenzene or nitrobenzene, alicyclic compounds such as cyclohexane, alkanes such as heptane or iso-octane, ketones and ethers such as acetone, methyl ethyl ketone, methyl isobutyl ketone and ethyl ether, and esters.

The diamines (reactive monomer) do not react with the phase change material, which accordingly does not reduce the amount of free phase change material available for thermal energy storage.

The polymeric shell can be polymerized so as to incorporate useful additives such as emulsifiers, plasticizers, etc.

The following examples are not meant to limit the invention in any way.

EXAMPLE 1

Preparation Of Small Particles [0.05 < diameter (mm) < 1.0] Of Phase Change Material Small particles of CARBOWAX® polyethylene glycol 8000 (of Union Carbide Corporation) and salts of various hydrates, such as, $CaCl_2.6H_2O$, were prepared using a Lightning variable speed mixer (Mixing Equipment Company, Inc.) with an agitator having a double set of three blade paddles. At 5 weight percent in Marcol TM 90 light oil (Exxon), Span TM 80 (ICI Americas Inc.) was an effective stabilizer. A volume ratio of 10/90 of polar/oil phases was mixed at 750 rpm for 10 minutes at 70° C. The polar phase was CARBOWAX® polyethylene glycol 8000 Aliquots (30 ml) of this dispersion were then added to Marcol TM 90 light oil (25° C.) stirred at 100 rpm. A typical particle size distribution of a CARBOWAX® polyethylene glycol 8000 dispersion by the above procedure is given in Table I:

TABLE I

| Screen opening (mm) | Wt. Percent |
| --- | --- |
| 425 | 7.4 |
| 250 | 6.7 |
| 75 | 77.1 |
| 63 | 4.4 |
| <63 | 4.4 |

EXAMPLE 2

Preparation Of Large Particles [1.0 < diameter (mm) < 10.0] Of Phase Change Material Drops of molten CARBOWAX® polyethylene glycol 8000 or a molten salt hydrate specifically, $CaCl_2.6H_2O$, $Na_2SO_4.10H_2O$ and $Na_2HPO_4.12H_2O$, were placed on a bed of dry ice. This operation and subsequent warming to room temperature were performed in a dry atmosphere to keep ambient moisture from condensing on the particles. All of the salt hydrate particles were stored at room temperature in tightly sealed vials in a dry box to maintain their compositional integrity.

EXAMPLE 3

Preparation Of Large Particles [1.0 < diameter (mm) < 10.0] Of Phase Change Material Drops of molten CARBOWAX® polyethylene glycol 8000 or a molten salt hydrate, specifically, $CaCl_2.6H_2O$, $Na_2SO_4.10H_2O$ and $Na_2HPO_4.12H_2O$, were allowed to fall about 5 feet into a dewar containing at least 6 inches of liquid nitrogen. The particles were recovered from the liquid nitrogen and warmed to room temperature in a dry atmosphere.

The techniques of Examples 2 and 3 were equally effective in making spherical CARBOWAX® polyethylene glycol 8000 particles.

EXAMPLE 4

Preparation Of Large Particles [1.0 < diameter (mm) < 10.0] Of Phase Change Material Phase change materials were also made by placing droplets of molten CARBOWAX® polyethylene glycol 8000 or a molten salt hydrate, specifically, $Na_2HPO_4.12H_2O$, $Na_2SO_4.10H_2O$ and $CaCl_2 6H_2O$, on a polytetrafluoroethylene plate marked with shallow, rounded indentations to contain the droplets while they are solidified. The plate was precooled by surrounding it with dry ice.

Fluids, such as mineral oil or silicone fluid, were used to fill the void space which resulted in salt hydrate particles prepared by the methods in Examples 2 to 4. The particles were placed in a small beaker containing mineral oil or silicone fluid which then was placed in a desiccator. When vacuum was applied to the desiccator, fluid was imbibed into the evacuated voids.

EXAMPLE 5

Preparation Of Large Particles [1.0 < diameter (mm) < 10.0] Of Phase Change Material Formation of salt hydrate particles and the filling of their void space were accomplished simultaneously. The salt hydrates used in this example are $CaCl_2.6H_2O$, $Na_2HPO_4.12H_2O$ and $Na_2SO_4.10H_2O$. Referring to FIG. 1, apparatus 100 is the recommended apparatus for producing large salt hydrate particles [1.0 < diameter (mm) 10.0]. Graduated cylinder 102 is filled with dry ice-acetone (−75° C.). Glass tube 104 (10 mm O.D.) containing L-45 (10 cS) silicone fluid or n-hexane is inserted into the dry ice-acetone in cylinder 102 so as to contact the bottom of cylinder 102. The bottom of tube 104 is closed. Glass tube 104 stands vertically in place and extends 3 inches above the top of cylinder 102. Either the n-hexane or silicone fluid (that is, 10cS L-45 of Union Carbide Corporation) in the tube 104 was first cooled to −10° C. or lower. Then molten salt hydrate drops were placed into the cold fluid (in tube 104) whose depth was sufficient to assure solidification of the particles before they touched the bottom. This method was the most effective one for preparing salt hydrate particles for encapsulation, especially those susceptible to water loss or gain exposed to moisture in the air.

EXAMPLE 6

Void Spaces In Large Particles Of Salt Hydrate

Large Particles [1.0 < diameter (mm) < 10.0] of the salt hydrates $Na_2HPO_4.12H_2O$, $Na_2SO_4.10H_2O$ and $CaCl_2.6H_2O$ had void space when they were prepared by thermal quenching whether in liquid nitrogen, on a bed of dry ice, on a cold polytetrafluoroethylene plate, in cold (−75° C.) n-hexane, or in cold (-72° C.) silicone fluid. See Examples 2 to 5 above. Quantification of the void space was difficult because of the propensity of salt hydrates to exchange water with surrounding air. For ten $CaCl_2.6H_2O$ salt hydrate particles, the void space averaged 6 volume percent. In Example 5, the quenching $CaCl_2$ salt hydrate in −72° C. silicone fluid (10 cS) or in −75° C. normal hexane yielded hard spherical particles which were well-protected from atmospheric moisture and which were well-suited for subsequent coating and immersion in reactive fluids.

EXAMPLE 7

Coating Particles Of Phase Change Material With Reactive Monomer

About 100 CaCl$_2$ salt hydrate particles had an average weight increase of 3.0 weight percent when coated with a 25/75 (wt.) mixture of ethylenediaminetriethylenetetraamine containing 5 weight percent of Cabosil M-5. The standard deviation was ±0.3 weight percent.

About 100 CARBOWAX® polyethylene glycol 8000 particles were coated with a 25/75 mixture of ethylenediamine-triethylenetetraamine containing 5 weight percent of Cabosil M-5.

EXAMPLE 8

Preparation Of The Prepolymer Used For Encapsulation

The prepolymers prepared were isocyanate-capped oligomers. Generally, the preparation scheme included these steps:
(a) Used the isocyanate as received.
(b) Removed water from the diol by heating at 80° C. for one hour at a pressure of 2 mm Hg or less.
(c) Placed the isocyanate into a dry reaction flask, attached a dropping funnel containing the pre-weighed diol to the reaction flask, blanketed with dry nitrogen, and heated to reaction temperature (typically 80° C.).
(d) After the isocyanate attained reaction temperature, added diol at about 1.0 to 1.25 g/min, while stirring and maintaining a nitrogen environment.
(e) Following the addition of the diol, measured the free isocyanate content.
(f) Continued heating and stirring until the free isocyanate content stabilized.
(g) Optionally added 0.03 weight percent of catalyst (e.g., dibutyltin dilaurate) to hasten the final reaction steps. After the catalyst had been added, heated and stirred for another hour before measuring the free isocyanate content.
(h) Cooled to room temperature, transferred to a glass container with a tight lid, blanketed with nitrogen, and stored in freezer.

Prepolymers (the flexible segment) were made using the above procedure from a castor oil, a silicone diol, a polycaprolactone, and a polytetramethylene glycol. These diol monomers were capped or terminated with isocyanates by reaction with their terminal hydroxyl groups. The isocyanates were MDI, H$_{12}$MDI [4,4'-methylenebis (cyclohexylisocyanate) obtained as Mobay's Desmodur™ W], polyfunctional amines (Mobay's PAPI™ Series), and TDI.

The technique for making the free isocyanate determinations is as follows:

One of the most effective prepolymers incorporated polybutadiene diol as the flexible segment. Prepolymer based on this material cannot be analyzed using the conventional free isocyanate test. The new test requires tetrahydrofuran (THF) to solubilize the polybutadiene segment and comprise the following steps:
(a) To a clean dry 500 ml Erlenmeyer flask, add about 4 grams of prepolymer.
(b) Add 200 ml of tetrahydrofuran (dried over Linde molecular sieves), stopper the flask, and swirl until the sample is dissolved.
(c) Pipette 20 ml of dibutylamine solution 1.0 N in dry tetrahydrofuran, THF) into the flask, swirl, and allow to stand at room temperature for at least 10 minutes.
(d) Add 10 drops of bromophenol blue (0.1 weight percent in dry methanol).
(e) Titrate with 1.0 N HCl to first yellow end point. Run samples in duplicate, and run a blank determination in the same way, omitting the addition of isocyanate sample (in step (b), 100 ml of tetrahydrofuran is sufficient). Calculation of the amount of free isocyanate is as follows:

$$\text{Weight percent of free isocyanate} = \frac{(B - A) \times N \times 4.2}{\text{sample weight (g)}}$$

wherein
A = ml of HCl added to the sample
B = ml of HCl added to the blank
N = normality of the aqueous HCl

EXAMPLE 9

Encapsulation Of Small Particles [0.05 < diameter (mm) < 1.0] Of Phase Change Material Small CARBOWAX® polyethylene glycol 8000 particles were encapsulated to demonstrate the method and to show its applicability to other phase change materials. The technique consisted of coating the small CARBOWAX® polyethylene glycol 8000 particles of Example 1 with reactive component no. 1, a diol or diamine or mixture thereof. This was achieved by vigorously agitating a dispersion of the CARBOWAX® polyethylene glycol 8000 particles at room temperature in an organic fluid (e.g., cyclohexane) containing a surfactant (e.g., 5 weight percent of SPAN™ 80). Then reactive component no. 1 was added and mixing continued to assure its covering the CARBOWAX® particles. Reactive component no. 2, an isocyanate-capped prepolymer, together with a catalyst (e.g., dibutyltin dilaurate at 0.03 weight percent), were added at this point as a solution. Properly designed prepolymer oligomers prepared according to Example 6 reacted quickly with the diol or diamine coating surrounding the phase change particles to form polyurethane or polyurethane-urea shells, respectively. Special demands on the organic continuous phase are that it be a non-solvent for the CARBOWAX® polyethylene glycol 8000 particles and the diol or amine components and that it be a room temperature solvent for the prepolymer.

EXAMPLE 10

Encapsulation Of Large Particles [1.0 < diameter (mm) < 10.0] Of Phase Change Material Coating the large particles with reactive component no. 1, which as in small particle encapsulation, was some combination of diamines and/or diols, was the first step in the encapsulation of large particles of phase change material. The particles were then immersed in an organic solution of reactive component no. 2, that is the prepolymer, where interfacial polymerization at room temperature led to the formation of a durable polymeric shell. There is an important distinction between the processes by which small and large particles of phase change material were suspended in the prepolymer solution. Whereas small particles were conveniently suspended during capsule formation by moderate mixing (e.g., a paddle mixer in a beaker), the shells of larger particles were quickly damaged by similar treatment. Particularly in the early stages of shell formation, contact of the polymer shells with other solid objects, such as other particles, reactor walls, etc., should be minimized. Accordingly, particles of phase change material (prepared as in Example 2) coated with reactive component no. 1 were dropped into prepolymer solution contained in a 20 inch long glass tube (10 mm OD) which was sealed at one end. The prepolymer was prepared as in Example 6. After the large particles of phase change material were placed in tube 104. the end was stoppered, and just before the falling particles reached the tube bottom, tube 104 was inverted. Then tube 104 was periodically inverted until sufficient time elapsed to form the polymeric shell.

EXAMPLE 11

Figure 2:
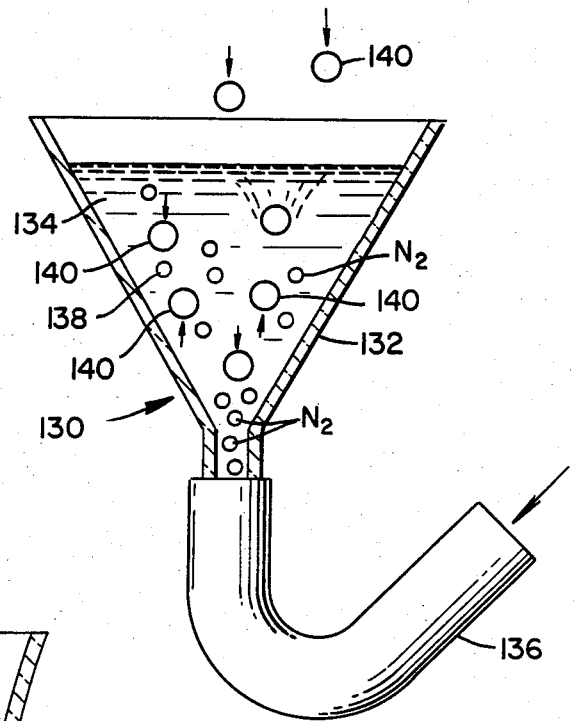
FIG. 2 is an elevational side view of an ebulating reactor.

Encapsulation Of Large Particles [1.0<diameter (mm)<10.0] Of Phase Change Material This is another method of minimizing contact of the polymeric shells of larger particles of phase change material with other solid objects, especially during the early stages of shell formation. The "ebulating reactor" of FIG. 2 was used to gently agitate particles of phase change material coated with reactive component no. 1 in prepolymer solution. The prepolymer was prepared as in Example 6. FIG. 2 shows the "ebulating reactor" in which particle-particle and particle-wall contact is minimized while a polymeric shell grows around the particles of phase change material. The reactor is made from a Pyrex 60° funnel having an inside diameter at the top of 100 mm and a stem length of 95 mm. The amount of constriction in the throat area located at the bottom of the conical section was critical and was arrived at by trial and error in constructing each reactor. The flow rate of nitrogen (saturated with the same solvent used in the reactor) was adjusted to prevent particles from settling in the throat region but not so high as to cause splashing of the prepolymer solution.

Figure 3:
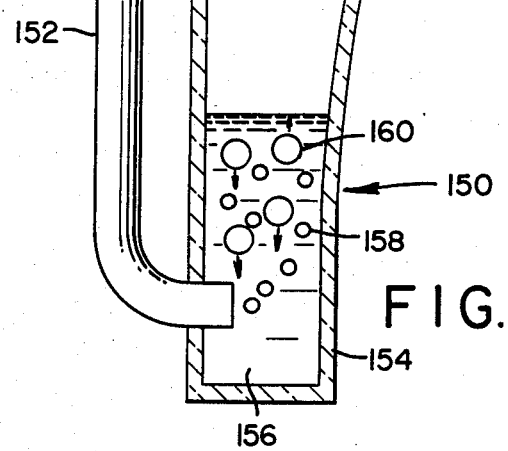
FIG. 3 is a partially-cut away elevational side view of another ebulating reactor.
Figure 4:
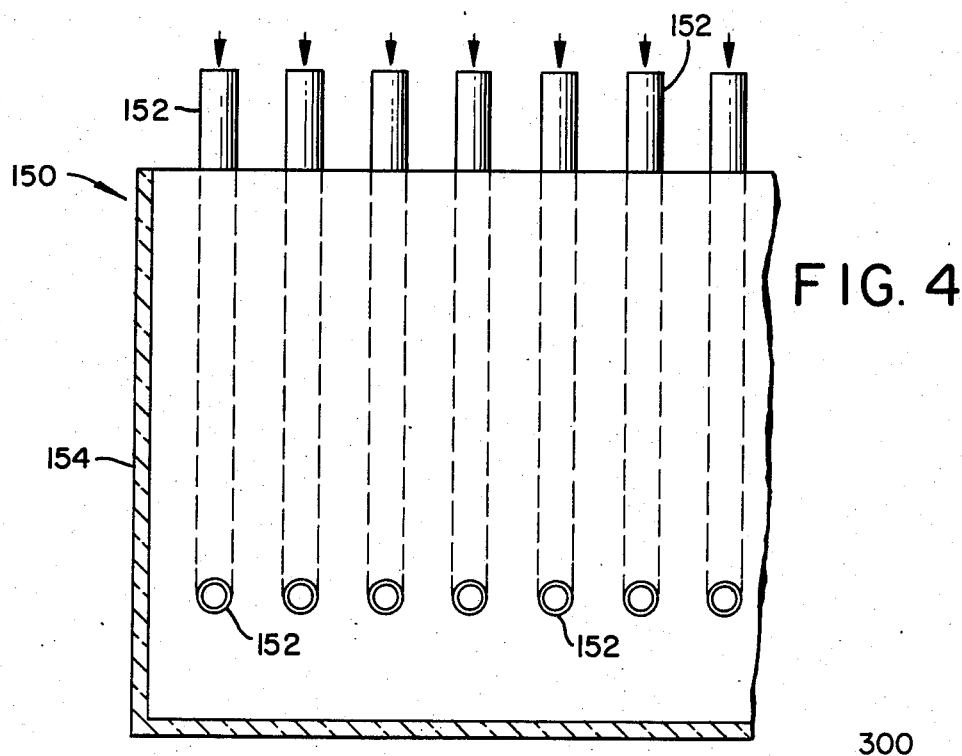
FIG. 4 is a further partially-cut away elevational front view of the ebulating reactor of FIG. 3.

When the diameters of the particles of phase change material ranged from 1 to 5 mm, up to five particles could be in the reactor at the same time. To increase the productivity of these batch reactions, the reactor can be stretched in one dimension to make it a long trough having a triangular cross section. Such reactors were constructed with special care given to the flow rate of nitrogen and to the dimensions of the distribution holes in the throat region. FIG. 3 shows a scale-up of the "ebulating reactor" of FIG. 2. The poly(methyl methacrylate) reactor is ebulated through six tubes (15 gauge syringe tubing). FIG. 4 shows another scale-up of the "ebulating reactors" of FIGS. 2 and 3. Thirty-five tubes (15 gauge syringe tubing) provide ebulation—the reactor is six inches wide. CARBOWAX ® polyethylene glycol 8000 particles were successfully encapsulated using the reactor of FIG. 4.

After shell formation in the "ebulating reactor," the encapsulated particles were washed in normal hexane to remove residual unreacted prepolymer and to deswell the polymeric shell. Finally the encapsulated particles of phase change material were stored in a dry nitrogen atmosphere.

Table II lists several phase change materials which have been encapsulated by the method of the invention:

TABLE II

Phase Change Material Particles Encapsulated In Polyurethane/Urea Shells (1)

| Phase Change Material | Amine Mixture | | Prepolymer Solution | | |
|---|---|---|---|---|---|
| | Weight Ratio EDA/TETA | Wt. % Cabosil | NCO/OH | Elastomeric Segment | Wt. % Prepolymer Isocyanate in cyclohexane |
| (6) | 90/10 | 5 | 2/1 | PCL (2) | TDI (3) 2.5 (4) |
| (6) | 25/75 | 5 | 2/1 | PBD (5) | TDI 4.0 |
| $Na_2HPO_4.12H_2O$ | 25/75 | 5 | 2/1 | PBD (5) | TDI 4.0 |
| $Na_2S_2O_3.5H_2O$ | 25/75 | 5 | 2/1 | PBD (5) | TDI 4.0 |
| $Na_2SO_4.10H_2O$ | 25/75 | 5 | 2/1 | PBD (5) | TDI 4.0 |
| $CaCl_2.6H_2O$ | 25/75 | 5 | 2/1 | PBD (5) | TDI 4.0 |
| Urea | 25/75 | 5 | 2/1 | PBD (5) | TDI 4.0 |

| Phase Change Material | Wt. % Catalyst in prepolymer solution (1) | Results | |
|---|---|---|---|
| | | Coherent Shell produced? | Survived more than 10 freeze/thaw cycles in air? |
| (6) | 0.04 | YES | YES |
| (6) | 0.04 | YES | YES |
| $Na_2HPO_4.12H_2O$ | 0.04 | YES | YES |
| $Na_2S_2O_3.5H_2O$ | 0.04 | YES | YES |
| $Na_2SO_4.10H_2O$ | 0.04 | YES | YES |
| $CaCl_2.6H_2O$ | 0.04 | YES | YES |

TABLE II-continued

Phase Change Material Particles Encapsulated In Polyurethane/Urea Shells (1)

| | | | |
|---|---|---|---|
| Urea | 0.04 | YES | NO (decomposes) |

Notes:
(1) Catalyst is dibutyltin dilaurate
(2) Polycaprolactone (UCC PCP-0260)
(3) Toluene diisocyanate isomers (Mobay's Mondur TM TD-80)
(4) Mixed solvent: 75/25 (Wt.) toluene/cyclohexane
(5) Polybutadiene diol (ARCO Poly BD R-45HT)
(6) CARBOWAX ® polyethylene glycol 8000

Multiple layers are possible using the invention technique. This was demonstrated by adding (using the invention process a second layer over CARBOWAX ® polyethylene glycol 8000 particles that had already been encapsulated once.

Concerning the ebulating reactors, in FIG. 2, ebulating reactor 130 has hose 136 attached to the bottom of funnel 132. Fluid 134 is located in funnel 132. Nitrogen is passed through hose 136 into the fluid 134 in funnel 132 and forms upward moving bubbles 138. Particles 140 (which are particles of phase change material coated with reactive monomer) are dropped into fluid 134. Bubbles 138 keep particles 140 in suspension with minimal contact between themselves and the side of funnel 132. In FIG. 3, ebulating reactor 150 has elongated trough 154 with six (for example) tubes 152 located in the lower back portion thereof. Fluid 156 comes up to the outward slanted front face of trough 154. Nitrogen bubbles 158 keeps particles 160 in suspension. In FIG. 4, ebulating reactor 150 is shown a frontal cutaway view illustrating seven tubes 152 of a bank of 35 tubes.

EXAMPLE 12

Thermal Cycling Using A Quiescent Heat Transfer Fluid

Figure 5:
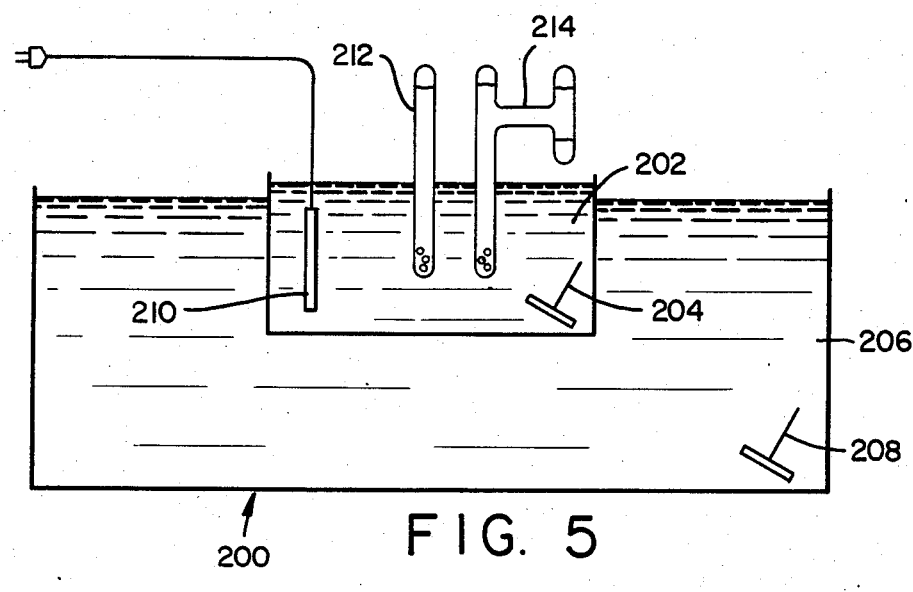
FIG. 5 is a schematic diagram of apparatus for thermocycling the encapsulated phase change material.

To determine the effect of thermal cycling on an organic phase change material, represented by CARBOWAX ® polyethylene glycol 8000, and on an inorganic phase change material, represented by $CaCl_2$ salt hydrate (technical grade $CaCl_2 \cdot 6H_2O$), each were immersed in two different heat transfer fluids, hermetically sealed in glass tubes, and cycled above and below their equilibrium melting point for one week. Thermal cycling apparatus 200 for encapsulated phase is shown in FIG. 5. Small temperature bath 202, equipped with stirrer 204, is positioned in large temperature bath 206, also equipped with stirrer 208. The fluid in both temperature baths is well stirred. Immersion heater 210 in the small temperature bath automatically cycles on and off. First tube 212 contains encapsulated phase change material particles and anhydrous heat transfer fluid. Second tube 214 contains encapsulated phase change material particles and water-saturated heat transfer fluid. The rack (not shown) holding the hermetically-sealed glass tubes is rotated one-half turn at 15 second intervals. Possible interactions between the phase change materials and heat transfer fluids were further examined by using the fluids in their anhydrous form (tubes 212) in one set of samples and fully water-saturated (tubes 214) in another set.

The large temperature bath contained 50/50 (volume) of ethylene glycol/water and was maintained between $-1°$ and $-4°$ C. The smaller bath, a 2 liter wide mouth reaction kettle, was filled with L—45 silicone fluid (10 cS) A 600 watt, 115 volt, immersion heater in the small bath repetitively turned on for one hour and off for two causing the small bath temperature to vary between $-2°$ and $78°$ C. eight times every 24 hours. The cycling of the encapsulated particles completely melted and completely solidified the particles during each cycle.

One heat transfer fluid, a polyalphaolefin (8 cS SYN-FLUID TM), was used as received. The other heat transfer fluid, a silicone fluid (10 cS L—45), was made anhydrous by holding it at $85°$ C. for one hour at a pressure of 0.5 mm Hg. To saturate these fluids with water as required in half of the cycling investigations, one inch deep layers of each were contacted with distilled water for at least three days at room temperature.

Figure 6:
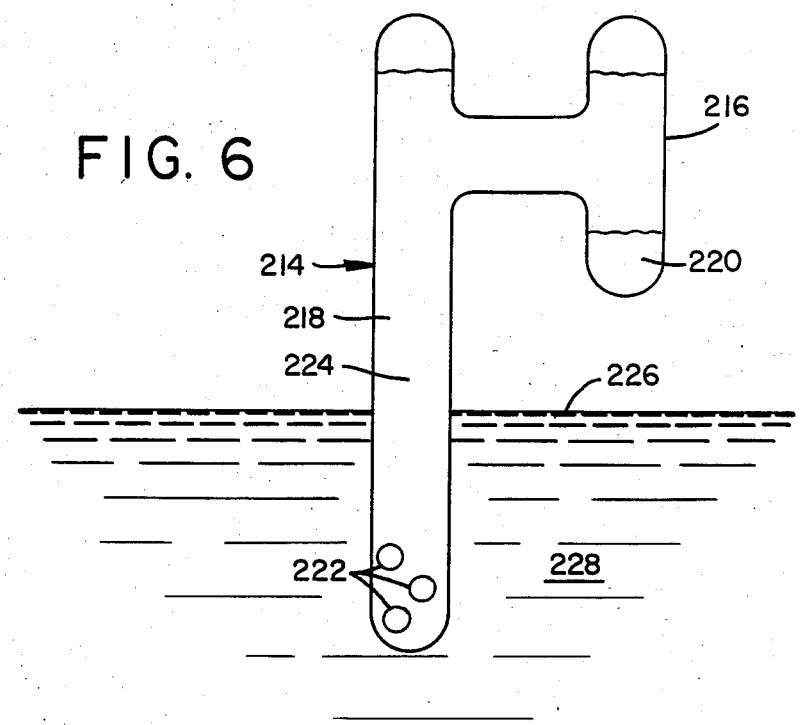
FIG. 6 is a view of one of the sealed tubes used in the apparatus of FIG. 5.

Referring to FIG. 5, glass tubes containing encapsulated phase change material particles and anhydrous heat transfer fluids were hermetically sealed to prevent any transfer of water to or from the tube during the test. Tubes containing encapsulated particles and water-saturated heat transfer fluid were also hermetically sealed. See FIG. 6 which illustrates side arm 216 that is shaped like a "T" laying on its side. These tubes were constructed to allow water layer 220 at room temperature to remain in contact with heat transfer fluid 218 throughout the test, maintaining its water-saturation. Encapsulated phase change material particles 222 were located in the bottom of long arm 224. The bottom end of long arm 224 was located below the surface (226) of temperature bath 228, which was cycled between $-2°$ and $78°$ C. The atmospheric temperature above surface 226 was kept at $78°$ C. After one week of cycling (54 complete cycles) the glass tubes were carefully broken. The particles were recovered and tested using differential scanning calorimetry (DSC), as described below. One of the encapsulated ($CaCl_2$ salt hydrate) particles leaked. In all of the salt hydrate capsules, a noticeable stratification occurred; a white sediment constituted the bottom layer and was overlaid with a clearer region. No stratification was apparent in the CARBOWAX ® polyethylene glycol 8000 particles. After the 54 cycles, all capsules were still flexible when heated above their melting point.

The most important evaluation of the particles heat storage capacity after repeated thermal cycling is the quantitative one supplied by the DSC analysis. In all cases at least three of the capsules cycled in each tube were individually studied on the DSC. For the CARBOWAX® polyethylene glycol 8000 particles, the cycled particles showed no significant deviation in their heats of fusion from those of the initial particles. Apparently, the water in the heat transfer fluids surrounding the cycling particles was not appreciably absorbed into the CARBOWAX® polyethylene glycol 8000 particles. The particles cycled in water-saturated polyalphaolefin appeared to have a greater standard deviation than others. Similar to the CARBOWAX® polyethylene glycol 8000 capsules, those containing $CaCl_2$ salt hydrate showed, on the average, retention of their heat of fusion. The thermal storage capabilities of encapsulated salt hydrates after 54 cycles was not significantly changed and the average heat of fusion was maintained although more variance among the particles was observed after recycling than before recycling.

EXAMPLE 13

Packed Bed Heat Exchanger Using Encapsulated Phase Change Material

Figure 7:
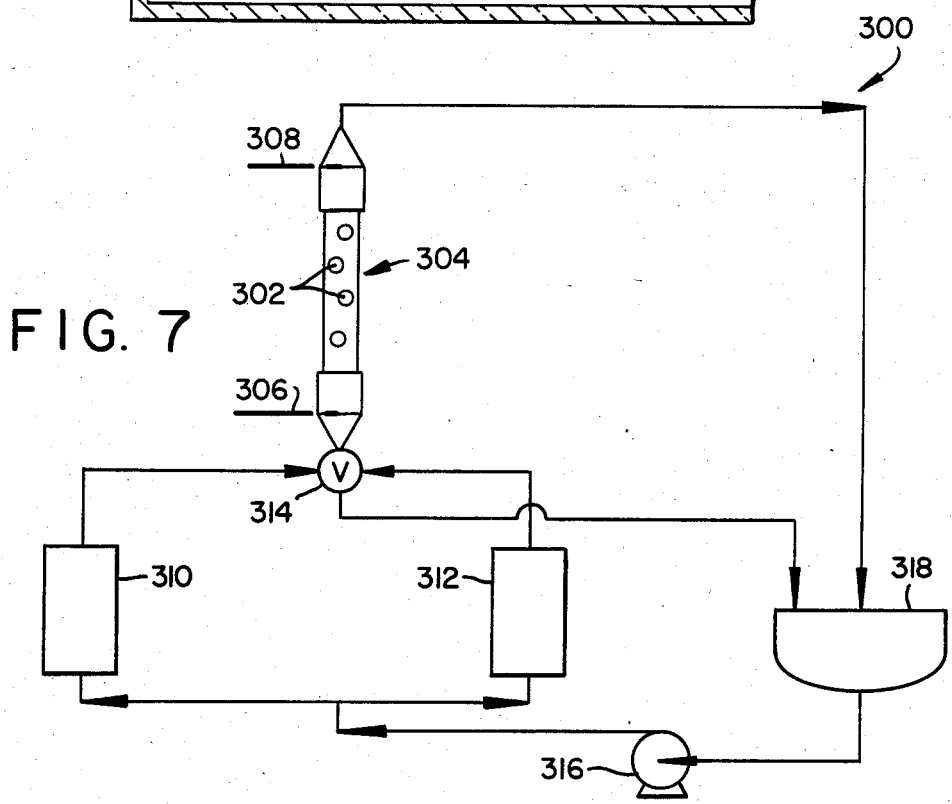
FIG. 7 is a schematic diagram of an active heat transfer apparatus incorporating the invention encapsulated phase change material particles.

To demonstrate an active heat transfer scheme incorporating encapsulated phase change material and to further verify capsule durability, a packed bed heat exchanger was constructed. FIG. 7 shows apparatus 300 in which 100 encapsulated CARBOWAX® polyethylene glycol 8000 particles 302 were cycled 10 times over a period of two days. The encapsulated particles were loaded into packed bed heat exchanger 304 consisting of a 75 mm long section of 10 mm OD glass tubing. A Monel screen (100 mesh) at either end of the bed served to retain the particles and also to distribute the flow at the inlet. Exchanger 304 was capped with specially constructed Teflon end pieces which also provided ports for temperature measurement. Inlet and outlet exposed-junction thermocouples 306 and 308 (0.040 inch sheath diameter) extended into the fluid channel to assure rapid response to variations in the fluid temperature. Two inches of rigid foam insulation [K=0.15 BTU/ft²-hr-(°F./inch)] surrounded the packed bed.

Silicone fluid (10 cS L- 45) was the circulating heat transfer medium. Hot bath (exchanger) 310 through which it ran was at 90° C. and cold bath (exchanger) 312 at 20° C. All of the tubing, including the coils in the hot and cold baths, were ⅛ inch O.D. stainless steel. Charging and discharging of the packed bed was accomplished using the 4-way valve 314 near the packed bed inlet. An Altex Model 100A pump 316 designed for liquid chromatography application, guaranteed constant flow rates of the silicone fluid. Four-way ball valve 314 allowed the recycle to feed reservoir 318 of either cold or hot heat transfer fluid, whichever was not flowing through heat exchanger 304.

Whether the heat transfer fluid flow rate was 0.5 or 5.0 ml/min, there was a subcooling of 12° C. This contrasts with data from the DSC data which showed a consistent subcooling of 30° C. This difference was not surprising inasmuch as the cooling rate on the DSC was higher by at least a factor of two. The discrepancy indicates, however, the importance of evaluating encapsulated phase change materials in conditions close to their intended use.

The following formula is based on graphs of the tests wherein one uses areas in cooling curve graphs released from the phase transition:

$$A = qpC_p \int T(t)dt$$

wherein A is the latent heat released in the packed bed (calories), q is the flow rate of the heat transfer fluid (ml/min), p is the density of the heat transfer fluid, $C_p$ is the specific heat of the heat transfer fluid (calories/g −°C.), and $\int T(t)dt$ (°C.-min.) is derived from the test results.

Table III shows that almost 90 percent of the latent heat was picked up by the heat transfer fluid. Most of the missing 10 percent was lost through the glass wall of the heat exchanger. These results illustrate one application of encapsulated phase change materials particles. They also show that quantitative evaluations of encapsulated phase change materials can be derived from bench scale apparatus. Such data complements and extends the DSC analyses of Example 12.

TABLE III

Calculation Of Latent Heat Released To Silicone Heat Transfer Fluid From Packed Bed Of 100 Encapsulated CARBOWAX ® Polyethylene Glycol 8000 Particles

| q (ml/min) | T(t) dt(°C.-min)(1) | A(cal) | A/1.323 (cal/g)(1) | Percent Latent Heat Recovery(2) |
|---|---|---|---|---|
| 2.0 | 59.0 | 43.3 | 32.7 | 92 |
| 5.0 | 23.0 | 42.1 | 31.8 | 89 |

Notes:
(1) Weight of CARBOWAX ® polyethylene glycol 8000 in packed bed was 1.323 g.
(2) Heat of fusion of encapsulated CARBOWAX ® polyethylene glycol 8000 is 35.7 (cal/g).

EXAMPLE 14

Thermal Analysis Results Using Differential Scanning Calorimetry (DSC)

The same general testing procedure was applied to all analyses conducted with the Differential Scanning Calorimeter whether the phase change materials were encapsulated or not. The Differential Scanning Calorimeter was a DuPont Model 910 to which was attached a DuPont Instruments mechanical cooling accessory (Model 990476.982). Samples were run in hermetically sealed cups (DuPont top 900794901 and bottom 900793901) which were contained in a dry nitrogen environment throughout the test. The sample was first heated (about 10° C./min) to a temperature 20° C. above its melting point and held at this temperature for 5 minutes to assure complete melting of the phase change material. Then it was cooled at precisely 10° C./min to 40° C. below its equilibrium melting temperature and held at the lower limit for three minutes or until the phase transition was complete. Data was collected only on the cooling leg of this cycle. CARBOWAX® polyethylene glycol 8000 and $CaCl_2$ salt hydrate particles repetitively cycled on the Differential Scanning Calorimeter, as just described, consistently gave the same results.

The CaCl$_2$ salt hydrate that was recycled for one week in anhydrous and saturated heat transfer fluids required more careful handling when opening the encapsulated particles for analysis in order to prevent hydration.

EXAMPLE 15

Small Particles [0.05 < diameter (mm) < 1.0] Of Phase Change Material

CARBOWAX® polyethylene glycol 8000 particles encased in a clear elastomeric coating were prepared using the procedure of Example 1. In this experiment, the CARBOWAX® polyethylene glycol 8000 dispersion consisted of 98.52 weight percent of cyclohexane, 0.04 weight percent of SPAN™ 80 and 0.36 weight percent of CARBOWAX® polyethylene glycol 8000 particles. The diol/diamine coating, as a percent of the entire system, was 0.54 weight percent of CARBOWAX® polyethylene glycol 600 and 0.54 weight percent of triethylenetetramine. The prepolymer solution was 5.0 weight percent of prepolymer and 0.01 weight percent of dibutyltin dilaurate catalyst in cyclohexane. The prepolymer had an NCO/OH ratio of 2/1 and was made from polybutadiene diol (Poly BD R-45HT) and a toluene diisocyanate isomeric blend (Mondur™ TD-80). Equal weights of the dispersion and prepolymer solution were mixed. A five minute reaction time at room temperature produced the samples.

COMPARATIVE EXAMPLE A

Some CARBOWAX® polyethylene glycol 8000 was crosslinked with difunctional diphenylmethane-4,4'-diisocyanate (MDI) to place the composition in a stable form. The experiment showed that crosslinking sufficient to significantly reduce the molten state flowability of the CARBOWAX® polyethylene glycol 8000 reduced the heat of fusion of the CARBOWAX® polyethylene glycol 8000 to half of its original value.

COMPARATIVE EXAMPLE B

A classical mode of interfacial polymerization was followed by producing a polymer film around molten phase change material particles. Thus, reactive component no. 1 (monomer linking agent) was solubilized in the particle. Reactive component no. 2 (prepolymer) was added to the continuous phase in which both the phase change material and reactive component no. 1 were essentially insoluble. Contact of the reactive components at the interface between the molten phase change material and the continuous phase produced a polymer coating by the mechanism of interfacial polymerization. [See Morgan, P.M., "*Condensation Polymers: By Interfacial And Solution Methods*", Interscience Publishers, New York (1965).]

One important disadvantage of this method was that reactive component no. 1 was present at the interface in relatively low concentration and often led to inadequate film formation. A second disadvantage was that, owing to practical limits on the stability of liquid-liquid dispersions, phase change material particles greater than about a millimeter in diameter were difficult to make. Furthermore, even when smaller particles were acceptable or desirable, a polydispersed phase change material was, for all practical purposes, unavoidable. The greatest drawback of this method, however, was the intimate mixing of the phase change material and reactive component no. 1. For salt hydrates, in particular, such intimate mixing can destroy their heat of fusion.

Interfacial polymerization of a polymer film around molten phase change materials was not satisfactory.

COMPARATIVE EXAMPLE C

Particles of Na$_2$HPO$_4$.12H$_2$O, Na$_2$SO$_4$.10H$_2$O and CaCl$_2$.6H$_2$O (prepared as in any of Examples 2 to 4) were coated with a mixture of 25/75 (wt.) ethylene diamine/triethylenetetraamine (EDA/TETA). The result was a reduction of at least 75 percent in the heats of fusion of such particles. No filler was used in preparing such particles, so voids therein resulted allowing imbibition of the amines and formation of amine salts, and as a consequence a greatly reduced heat of fusion. This example is accordingly different from Example 4.

COMPARATIVE EXAMPLE D

Application of a vacuum (200 mm Hg) for two minutes to fill the void space of Na$_2$SO$_4$.10H$_2$O particles (prepared as in Example 2) submerged in mineral oil (25° C.) reduced their heat of fusion by 30 percent. This was primarily due to the removal of waters of hydration.

The preferred procedure and reaction conditions of the invention are:
(a) Prepare CARBOWAX® polyethylene glycol 8000 particles by quenching in liquid nitrogen or on a bed of dry ice. Prepare salt hydrate particles by quenching in −72° C. silicone fluid (10 cS).
(b) Coat PCM particles in amine mixture of 25/75 (wt) ethylenediamine/triethylenetetraamine containing 5 weight percent of Cabosil M-5.
(c) Roll the amine-coated particles 2 inches on a clean glass slide to remove excess amine mixture before dropping it into a 20 inch long 10 mm OD glass tube sealed at one end and containing prepolymer solution.
(d) For one minute, repeatedly invert the glass tube to prevent particles from settling. This short period in the glass tube minimizes formation of polyurethane/urea "tails" which form when the amine-coated particle is initially subjected to a turbulent prepolymer solution.
(e) Allow phase change material particle (around which a growing polyurethane/urea shell is now evident) to drop into an "ebulating reactor" containing 10 ml of prepolymer solution where it reacts for four minutes.
(f) Remove particles from reactor and wash in dry normal hexane for 15 minutes. This causes deswelling of the shell as cyclohexane transfers into the hexane. (At room temperature, normal hexane is a non-solvent for the prepolymer and the polyurethane/urea shell.)
(g) Dry particles at least one hour in a dry nitrogen atmosphere at room temperature permitting all normal hexane to volatilize.

(h) Store particles in a dry nitrogen atmosphere in tightly sealed vials.

(i) The prepolymer solution is 4 weight percent prepolymer dissolved in dry, reagent grade cyclohexane. The prepolymer is made from polybutadienediol toluene diisocyanate TDI having NCO/OH=2/1. Dibutyltin dilaurate catalyst is added (0.04 weight percent) just before the particles are dropped into the prepolymer solution.

It is also obvious that various changes, alterations and substitutions may be made in the compositions, methods and products of the present invention without departing from the spirit of the invention as defined by the following claims.

What is claimed is:

1. Process for preparing encapsulated phase change material particles for reusable thermal energy storage, comprising:
   (a) forming particles of a solid phase change material selected from the group consisting of a crystalline polymer, naphthalene, salt hydrate and a crystalline paraffin;
   (b) contacting said solid phase change material particles with a first reactive monomer which is terminated with reactive groups and which is in a liquid state, said first reactive monomer not being reactive with said solid phase change material particles, said first reactive monomer forming a coating thereof on the surface of said solid phase change material particles;
   (c) contacting said coated phase change material particles with a second reactive monomer which is terminated with reactive groups and which is in a liquid state; and
   (d) condensation polymerizing said first reactive monomer and said second reactive monomer to form a continuous, elastomeric, condensation polymeric shell around said particles.

2. Process as claimed in claim 1 wherein said particles (a) have a diameter between 0.05 and less than 1.0 mm.

3. Process as claimed in claim 1 wherein said particles (a) have a diameter between 1.0 and less than 10.0 mm.

4. Process as claimed in claim 1 wherein said phase change material is a crystalline polymer.

5. Process as claimed in claim 4 wherein said crystalline polymer is a crystalline polyethylene glycol.

6. Process as claimed in claim 1 wherein said phase change material is a salt hydrate.

7. Process as claimed in claim 6 wherein said salt hydrate is $CaCl_2.6H_2O$.

8. Process as claimed in claim 1 wherein said first reactive monomer and/or said second reactive monomer has at least one elastomeric segment.

9. Process as claimed in claim 1 wherein the reactive groups of said first reactive monomer are different than the reactive groups of said second reactive monomer.

10. Process as claimed in claim 1 wherein said condensation polymeric shell is composed of a condensation organic polymer.

11. Process as claimed in claim 10 wherein the condensation organic polymer is a polyurethane, a polyurea, a polyester, a polycarbonate, a polyamine or an interpolymer wherein the recurring units contain at least two different units of the classes of amide, urethane, urea, ester and carbonate.

12. Process as claimed in claim 1 wherein said polymerization step (d) is conducted in the presence of a catalytic amount of a polymerization catalyst.

13. Encapsulated phase change material particles for reusable thermal energy storage, comprising:
   (a) particles of said phase change material selected from the group consisting of a crystalline polymer, naphthalene, salt hydrate and a crystalline paraffin; and
   (b) a continuous, elastomeric, condensation polymeric shell encapsulating said particles, said polymeric coating being formed from a first reactive monomer, and a second reactive monomer, said first reactive monomer having been coated on the surface of said particles (a) while said particles (a) were in a solid state.

14. Encapsulated particles as claimed in claim 13 wherein said particles (a) have a diameter between 0.05 and less than 1.0 mm.

15. Encapsulated particles as claimed in claim 13 wherein said particles (a) have a diameter between 1.0 and less than 10.0 mm.

16. Encapsulated particles as claimed in claim 13 wherein said phase change material is a crystalline polymer.

17. Encapsulated particles as claimed in claim 16 wherein said crystalline polymer is a crystalline polyethylene glycol.

18. Encapsulated particles as claimed in claim 13 wherein said phase change material is a salt hydrate.

19. Encapsulated particles as claimed in claim 18 wherein said salt hydrate is $CaCl_2.6H_2O$.

20. Encapsulated particles as claimed in claim 13 wherein said first reactive monomer and/or said second reactive monomer has at least one elastomeric segment.

21. Encapsulated particles as claimed in claim 13 wherein the reactive groups of said first reactive monomer are different than the reactive groups of said second reactive monomer.

22. Encapsulated particles as claimed in claim 13 wherein said condensation polymeric shell is composed of a condensation organic polymer.

23. Encapsulated particles as claimed in claim 13 wherein the condensation organic polymer is a polyurethane, a polyurea, a polyester, a polycarbonate, a polyamine or an interpolymer wherein the recurring units contain at least two different units of the classes of amide, urethane, urea, ester and carbonate.

24. Encapsulated particles as claimed in claim 13 wherein said second reactive monomer is a prepolymer having an elastomeric portion and two terminal isocyanate groups.

25. Encapsulated particles as claimed in claim 24 wherein said elastomeric portion of said prepolymer is formed from an aliphatic diol.

26. Encapsulated particles as claimed in claim 24 wherein said flexible portion of said prepolymer is formed from an aliphatic diamine.

27. Process for the storage of heat comprising transfering heat to and from a heat storage medium which comprises the encapsulated phase change material of claim 13, the phase change material changing phase as it absorbs or releases heat.

* * * * *